US008145334B2

(12) United States Patent
Do et al.

(10) Patent No.: US 8,145,334 B2
(45) Date of Patent: Mar. 27, 2012

(54) METHODS AND SYSTEMS FOR ACTIVE DIAGNOSIS THROUGH LOGIC-BASED PLANNING

(75) Inventors: Minh Binh Do, Palo Alto, CA (US); Hector Luis Palacios Verdes, San Antonio de los Altos (VE); Rong Zhou, Cupertino, CA (US); Lukas Daniel Kuhn, Palo Alto, CA (US); Johan de Kleer, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 523 days.

(21) Appl. No.: 12/364,006

(22) Filed: Feb. 2, 2009

(65) Prior Publication Data

US 2010/0010657 A1  Jan. 14, 2010

Related U.S. Application Data

(60) Provisional application No. 61/079,456, filed on Jul. 10, 2008.

(51) Int. Cl.
*G06F 19/00* (2011.01)
*G06F 15/00* (2006.01)
*G05B 13/02* (2006.01)

(52) U.S. Cl. ............ 700/103; 700/109; 700/29; 700/39; 706/62; 706/906; 706/912; 706/914; 702/84; 702/182

(58) Field of Classification Search .................. 700/103, 700/80, 79, 99, 97, 9, 29, 30, 109; 706/62; 716/106; 702/84, 182
See application file for complete search history.

(56) References Cited

U.S. PATENT DOCUMENTS

| 4,563,746 | A | * | 1/1986 | Yoshida et al. ............... 706/906 |
|---|---|---|---|---|
| 5,006,992 | A | * | 4/1991 | Skeirik ............................ 700/47 |
| 5,009,833 | A | * | 4/1991 | Takeuchi et al. .............. 706/914 |
| 5,023,045 | A | * | 6/1991 | Watanabe et al. .............. 700/48 |
| 5,070,468 | A | * | 12/1991 | Niinomi et al. ............... 702/185 |
| 5,214,577 | A | | 5/1993 | Sztipanovits et al. |
| 5,268,834 | A | * | 12/1993 | Sanner et al. .................. 700/31 |
| 5,305,426 | A | * | 4/1994 | Ushioda et al. ............... 706/914 |
| 5,315,502 | A | | 5/1994 | Koyama et al. ................ 700/79 |
| 5,486,995 | A | * | 1/1996 | Krist et al. .................... 700/29 |
| 5,521,814 | A | * | 5/1996 | Teran et al. ................... 700/266 |
| 5,581,459 | A | * | 12/1996 | Enbutsu et al. ................ 700/32 |
| 5,587,930 | A | * | 12/1996 | Hori et al. .................... 702/185 |
| 5,701,394 | A | * | 12/1997 | Arita et al. ..................... 706/45 |

(Continued)

OTHER PUBLICATIONS

Arora, R; and Hsiao, M.S, "Enhancing SAT-based Bounded Model Checking Using Sequential Logic Implications", Aug. 2004, 17$^{th}$ Intl Conference on VLSI Design, ISBN 0-765-2072-3, IEEE Xplore Digital Library.*

(Continued)

*Primary Examiner* — Kakali Chaki
*Assistant Examiner* — Kelvin Booker
(74) *Attorney, Agent, or Firm* — Fay Sharpe LLP

(57) ABSTRACT

A control systems and methods are presented for controlling a production system, in which a model-based planner includes a formulation, such as a SAT formulation representing possible actions in the production, with a solver being used to provide a solution to the formulation based at least partially on production and diagnostic goals and the current plant condition, and a translation component translates the solution into a plan for execution in the plant.

20 Claims, 9 Drawing Sheets

U.S. PATENT DOCUMENTS

| | | | |
|---|---|---|---|
| 5,748,496 A * | 5/1998 | Takahashi et al. | 702/183 |
| 5,914,875 A * | 6/1999 | Monta et al. | 700/79 |
| 6,012,152 A * | 1/2000 | Douik et al. | 714/26 |
| 6,038,540 A * | 3/2000 | Krist et al. | 700/36 |
| 6,113,256 A * | 9/2000 | Bonissone et al. | 706/906 |
| 6,263,277 B1 | 7/2001 | Tanimoto et al. | |
| 6,272,483 B1 * | 8/2001 | Joslin et al. | 706/62 |
| 6,326,758 B1 | 12/2001 | Discenzo | |
| 6,411,908 B1 | 6/2002 | Talbott | |
| 6,415,276 B1 * | 7/2002 | Heger et al. | 706/52 |
| 6,651,048 B1 | 11/2003 | Agrawal et al. | |
| 6,725,208 B1 * | 4/2004 | Hartman et al. | 700/104 |
| 6,735,549 B2 | 5/2004 | Ridolfo | |
| 6,764,267 B2 | 7/2004 | Hart et al. | |
| 6,795,798 B2 * | 9/2004 | Eryurek et al. | 700/29 |
| 6,795,799 B2 * | 9/2004 | Deb et al. | 706/914 |
| 6,847,854 B2 | 1/2005 | Discenzo | |
| 6,853,930 B2 | 2/2005 | Hayashi et al. | |
| 6,895,292 B2 | 5/2005 | Fromherz et al. | |
| 6,898,475 B1 | 5/2005 | Ruml et al. | |
| 6,907,381 B2 | 6/2005 | Hayashi et al. | |
| 6,925,338 B2 * | 8/2005 | Eryurek et al. | 700/30 |
| 6,947,797 B2 * | 9/2005 | Dean et al. | 700/26 |
| 6,965,806 B2 * | 11/2005 | Eryurek et al. | 700/96 |
| 6,965,887 B2 * | 11/2005 | Huelsman et al. | 706/47 |
| 7,043,321 B2 | 5/2006 | Ruml et al. | |
| 7,062,478 B1 * | 6/2006 | Huelsman et al. | 706/47 |
| 7,139,629 B2 | 11/2006 | Fromherz et al. | |
| 7,162,393 B1 | 1/2007 | Vacar et al. | |
| 7,164,954 B2 * | 1/2007 | Lefebvre et al. | 700/47 |
| 7,206,771 B2 | 4/2007 | Alvarez et al. | |
| 7,216,018 B2 * | 5/2007 | Zuo et al. | 700/40 |
| 7,230,736 B2 | 6/2007 | Fromherz et al. | |
| 7,233,405 B2 | 6/2007 | Fromherz | |
| 7,346,404 B2 * | 3/2008 | Eryurek et al. | 700/65 |
| 7,356,383 B2 * | 4/2008 | Pechtl et al. | 700/288 |
| 7,433,743 B2 * | 10/2008 | Pistikopoulos et al. | 700/52 |
| 7,451,003 B2 * | 11/2008 | Chester et al. | 700/28 |
| 7,467,841 B2 | 12/2008 | Kamisuwa et al. | |
| 7,469,185 B2 * | 12/2008 | Mendrick et al. | 702/19 |
| 7,574,334 B2 * | 8/2009 | Tiwari et al. | 703/2 |
| 7,689,309 B2 * | 3/2010 | Zheng | 700/97 |
| 7,711,674 B2 * | 5/2010 | Arthur et al. | 706/62 |
| 7,725,857 B2 * | 5/2010 | Foltz et al. | 716/119 |
| 7,903,844 B2 | 3/2011 | Satonaga et al. | |
| 7,937,175 B2 * | 5/2011 | de Kleer et al. | 700/97 |
| 2004/0002776 A1 * | 1/2004 | Bickford | 700/30 |
| 2004/0088207 A1 | 5/2004 | Fromherz | |
| 2006/0064291 A1 | 3/2006 | Pattipatti et al. | |
| 2006/0230313 A1 | 10/2006 | Grichnik et al. | |
| 2007/0043607 A1 | 2/2007 | Howard et al. | |
| 2007/0129834 A1 | 6/2007 | Howard et al. | |
| 2008/0010230 A1 * | 1/2008 | Smith et al. | 706/45 |
| 2008/0010522 A1 | 1/2008 | Uwatoko et al. | |
| 2008/0039969 A1 * | 2/2008 | Liu et al. | 700/197 |
| 2008/0062211 A1 | 3/2008 | Kamisuwa et al. | |
| 2008/0071716 A1 | 3/2008 | Anderson et al. | |
| 2008/0148257 A1 | 6/2008 | Ruml et al. | |
| 2008/0215509 A1 * | 9/2008 | Charlton | 706/11 |
| 2009/0043809 A1 * | 2/2009 | Fakhouri et al. | 707/102 |
| 2009/0183777 A1 * | 7/2009 | Herman et al. | 137/2 |
| 2009/0204234 A1 * | 8/2009 | Sustaeta et al. | 700/29 |
| 2009/0204237 A1 * | 8/2009 | Sustaeta et al. | 700/36 |
| 2009/0204245 A1 * | 8/2009 | Sustaeta et al. | 700/99 |
| 2009/0204267 A1 * | 8/2009 | Sustaeta et al. | 700/291 |
| 2009/0210081 A1 * | 8/2009 | Sustaeta et al. | 700/99 |
| 2009/0228408 A1 * | 9/2009 | Kaushal et al. | 706/12 |
| 2009/0240366 A1 * | 9/2009 | Kaushal et al. | 700/110 |
| 2009/0265025 A1 * | 10/2009 | Brown | 700/98 |
| 2010/0010654 A1 * | 1/2010 | de Kleer et al. | 700/97 |
| 2010/0138026 A1 * | 6/2010 | Kaushal et al. | 700/104 |

OTHER PUBLICATIONS

Basu, S. and Kumar, R., "Quotient-Based Control Synthesis for Partially Observed Non-Deterministic Plants with Mu-Calculus Specifications", Dec. 2007, Proceedings of the 46th IEEE Conference on Decision and Control, ISBN 1-4244-1498-9, IEEE Xplore Digital Library.*

Darwiche, A., "Decomposable Negation Normal Form", Jul. 2001, Journal of the ACM, vol. 48, No. 4, pp. 608-647.*

Deng, S.; Bian, J.; Wu, W.; Yang, X.; and Zhao, Y., "EHSAT: An Efficient RTL Satisfiability Solver Using an Extended DPLL Procedure", Jun. 2007, Design Automation Conference 2007, ACM Online.*

Elliot, P., "An Efficient Projected Minimal Conflict Generator for Projected Prime Implicate and Implicant Generation", Feb. 2004, Massachusetts Institute of Technology, Department of Aeronautics and Astronautics.*

Gopalakrishnan, S; Durairaj, V. and Kalla, P., "Integrating CNF and BDD Based SAT Solvers", Nov. 2003, 8th IEEE Intl High-Level Design Validation and Test Workshop, ISBN 0-7803-8236-6, IEEE Xplore Digital Library.*

Thittamaranahalli, S.K., "Contributions to Algorithmic Techniques in Automated Reasoning About Physical Systems", Mar. 2005, Stanford University, Department of Computer Science.*

Voronov, A. and Akesson, K., "Supervisory Control Using Satisfiability Solvers", May 2008, Proceedings of the 9th Intl Workshop on Discrete Event Systems, ISBN 1-4244-2593-8, IEEE Xplore Digital Library.*

Vahidi, A.; Fabian, M. and Lennartson, B., "Generic Resource Booking Models in Flexible Cells", Sep. 2001, Proceedings of the 2001 IEEE Intl Symposium on Intelligent Control, ISBN 0-783-6722-7, IEEE Xplore Digital Library.*

Minh Do and Wheeler Ruml, "Lessons Learned in Applying Domain-Independent Planning to High-Speed Manufacturing", American Association for Artificial Intelligence, 2006.

Patrick Haslum and Hector Geffner, "Heuristic Planning with Time and Resouces", Department of Computer Science, Linkoping University, Sweden, and Departmento de Computacion, Universidad Simon Bolivar, Venezuela.

Richard Dearden and Dan Clancy, "Particle Filters for Real-Time Fault Detection in Planetary Rovers", Research Institute for Advanced Computer Science, NASA Ames Research Center.

Markus P.J. Fromherz, Daniel G. Bobrow, and Johan De Kleer, "Model-based Computing for Design and Control of Reconfigurable Systems", Palto Alto Research Center, Publishe in Al Magazine, Special Issue on Qualitative Reasoning, vol. 24, No. 4, 2003, pp. 120-130.

Roberto Cervoni, Amedeo Cesta, and Angelo Oddi, "Managing Dynamic Temporal Constraint Networks", National Research Council of Italy.

Rina Dechter and Judea Pearl, "Generalized Best-First Search Strategies and the Optimality of A", University of California, Los Angeles, California, Journal of the Association for Computing Machinery, vol. 32, No. 3, Jul. 1985, pp. 505-536.

Peter E. Hart, Nils J. Nilsson, and Bertram Raphael, "A Formal Basis for the Heuristic Determination of Minimum Cost Paths", IEEE Transactions of Systems Science and Cybernetics, vol. ssc-4, No. 2, Jul. 1968.

European Search Report, EP 10 15 6820, Jul. 8, 2010.

Arash Vahidi, Martin Fabian, Bengt Lennartson, "Generic Resource Booking Models in Flexible Cells", Control and Automation Laboratory Department of Signals and Systems, Chalmers University of Technology, 2001 IEEE.

Do, "Partial Satisfaction (Over-Subscription) Planning as Heuristic Search," 2004, Proceedings of KBCS-04.

de Kleer, "Diagnosing Multiple Faults," 1987, Artificial Intelligence, vol. 32, pp. 97-130.

Hamscher, "Issues in Model Based Troubleshooting," 1987, MIT A.I. Lab Memo 893.

Wu, "Scheduling with uncertain durations: generating B-robust scheduled using constraint programming.," ICAPS 2006 Workshop on Constraint Satisfaction Techniques for Planning and Scheduling Problems, pp. 134-137.

Do, "Sapa: A Scalable Multi-objective Heuristic Metric Temporal Planner,"2003, Journal of Artificial Intelligence Research, pp. 155-194.

Do, "Improving the Temporal Flexibility of Position Constrained Metric Temporal Plans,"2003, Proceedings of ICAPS '03, pp. 42-51.

de Kleer, "Fundamentals of Model-Bsed Diagnosis,"2003, Proceedings of the 5th IFAC Symposium on Fault Detection, Supervision, and Safety of Technical Processes, pp. 25-36.

van den Briel, "Effective Approaches for Partial Satisfaction (Over-Subscription) Planning,"2004, In Ninteenth National Conference on Artificial Intelligence (AAA1), pp. 562-569.

Bacchus, "Graphical models for preference and utility," 1995, in Proceedings of UAI.

Smith, "Choosing Objectives in Over-Subscription Planning," 2004, Proceedings of ICAPs-04, pp. 393-401.

Hoffman, "FF: The fast-forward planning system," 2001, A1 Magazine, vol. 22, No. 3, pp. 57-62.

Provan, "Model-Based Diagnosis and Control Reconfiguration for Discrete Event Systems: An Integrated Approach," 1999, Proceedings of the 38th Conference on Decision & Control, pp. 1762-1768.

Ruml, "On-line Planning and Scheduling for High-speed Manufacturing," 2005, ICAPS, pp. 30-39.

Verron, "A New Procedure Based on Mutual Information for Fault Diagnosis of Industrial Systems," published in Workshop on Advanced Control and Diagnosis, 2006.

\* cited by examiner

METHODS AND SYSTEMS FOR ACTIVE DIAGNOSIS THROUGH LOGIC-BASED PLANNING

REFERENCE TO RELATED APPLICATION

This application claims priority to and the benefit of U.S. Provisional Patent Application Ser. No. 61/079,456, which was filed Jul. 10, 2008, entitled HEURISTIC SEARCH FOR TARGET-VALUE PATH PROBLEM, the entirety of which is hereby incorporated by reference.

BACKGROUND

The present exemplary embodiments relate to active diagnosis and production control in systems having multiple resources for achieving production goals. In such systems, automated diagnosis of system performance and component status can advantageously aid in improving productivity, identifying faulty or underperforming resources, scheduling repair or maintenance, etc. Accurate diagnostics requires information about the true condition of components in the production system. Such information can be obtained directly from sensors associated with individual components and/or may be inferred from a limited number of sensor readings within the production plant using a model or other knowledge of the system structure and dynamics. Providing complete sensor coverage for all possible system faults can be expensive or impractical in harsh production environments, and thus it is generally preferable to instead employ diagnostic procedures to infer the source of faults detected or suspected from limited sensors. System diagnostic information is typically gathered by one of two methods, including dedicated or explicit diagnostics with the system being exercised while holding production to perform tests and record observations without attaining any production, as well as passive diagnostics in which information is gathered from the system sensors during normal production. Although the latter technique allows inference of some information without disrupting production, the regular production mode may not sufficiently exercise the system to provide adequate diagnostic information to improve long term productivity. Moreover, while dedicated diagnostic operation generally provides better information than passive diagnostics, the cost of this information is high in terms of short term productivity reduction, particularly when diagnosing recurring intermittent system component failures that require repeated diagnostic interventions. Conventional production system diagnostics are thus largely unable to adequately yield useful diagnostic information without halting production and incurring the associated costs of system down-time, and are therefore of limited utility in achieving long term system productivity. Accordingly, a need remains for improved control systems and techniques by which both long term and short term productivity goals can be achieved in production systems having only limited sensor deployment.

BRIEF DESCRIPTION

The present disclosure provides systems and methods for controlling a production plant, in which a model-based planner includes a formulation, such as a SAT formulation representing possible actions in the production, with a solver being used to provide a solution to the formulation based at least partially on production and diagnostic goals and the current plant condition, and a translation component translates the solution into a plan for execution in the plant.

In accordance with various aspects of the disclosure, a control system is provided, which includes a plant model, a diagnosis component that determines a current plant condition, and a planner that receives diagnostic and production goals. The planner provides a formulation with constraints and variables for each action to transition the plant from a starting state to a goal state. The planner also includes a solver that provides a solution to the formulation according to the production and diagnostic goals and the current plant condition, and a translation component which translates the solution into a plan for execution in the production plant. The formulation may also include an objective function evaluating the number of plant resources suspected of being faulty or the resource failure probabilities, which is used to select a solution based on the fault probabilities or the number of suspected plant resources.

In accordance with further aspects of the disclosure, a method is provided for generating plans for execution in a production system. The method includes determining a current plant condition based on a previously executed plans, at least one corresponding observation from the plant, and a plant model, as well as providing a formulation representing possible actions in the plant including constraints and variables for each action to transition the plant from a starting state to a goal state defined by at least one production goal. The method further includes solving the formulation to provide a solution to the formulation based on the production goal, the diagnostic goal, and the current plant condition. The method also includes translating the solution into a plan, and providing the plan to the plant for execution. In certain further aspects of the disclosure, solving the formulation further comprises evaluating an objective function based on the number of plant resources suspected of being faulty that are used in a given solution, and selecting a solution for which number of suspected resources used in the solution is closest to half of the suspected plant resources. In other aspects, solving the formulation further includes evaluating an objective function fault probabilities of plant resources, and selecting at least one solution based at least partially on the fault probabilities.

Still other aspects of the disclosure provide a computer readable medium with computer executable instructions for performing the steps of determining a current plant condition based at least partially on a previously executed plan, at least one corresponding observation from the plant, and a plant model, providing a formulation representing possible actions in the plant including constraints and variables for each action to transition the plant from a starting state to a goal state defined by the at least one production goal, solving the formulation to provide at least one solution to the formulation based at least partially on the at least one production goal, the at least one diagnostic goal, and the current plant condition, translating the solution into a plan, and providing the plan to the plant for execution.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
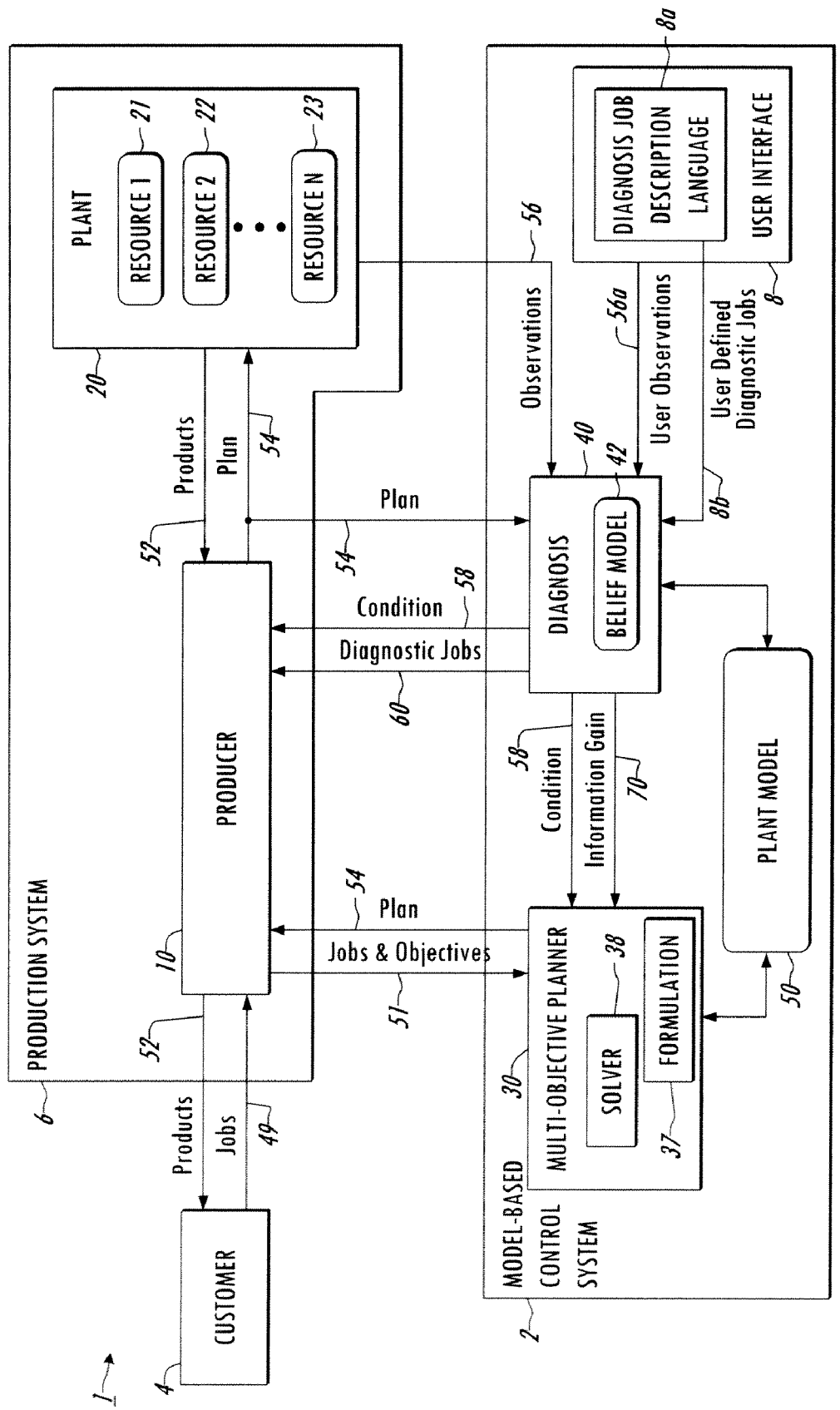
FIG. 1 is a schematic diagram illustrating a production system and an exemplary model-based control system with a planner, a plant model, a diagnosis component, and a operator interface in accordance with one or more aspects of the disclosure.

Referring now to the drawing figures, several embodiments or implementations of the present disclosure are hereinafter described in conjunction with the drawings, wherein like reference numerals are used to refer to like elements throughout, and wherein the various features, structures, and graphical renderings are not necessarily drawn to scale. The disclosure relates to production systems generally and is hereinafter illustrated and described in the context of exemplary document processing systems having various printing and document transport resources. However, the concepts of the disclosure also find utility in association with product packaging systems and any other type or form of system in which a plurality of resources, whether machines, humans, software or logic components, objects, etc., may be selectively employed according to plans comprised of a series of actions to achieve one or more production goals based at least partially on one or more diagnostic metrics or objectives, wherein all such alternative or variant implementations are contemplated as falling within the scope of the present disclosure and the appended claims.

The disclosure finds particular utility in constructing and scheduling plans in systems in which a given production goal can be achieved in two or more different ways, including use of different resources (e.g., two or more print engines that can each perform a given desired printing action, two different substrate routing paths that can be employed to transport a given printed substrate from one system location to another, etc.), and/or the operation of a given system resource at different operating parameter values (e.g., operating substrate feeding components at different speeds, operating print engines at different voltages, temperatures, speeds, etc.). The disclosed plan selection techniques and systems can be employed in association with any system whose normal operation is controlled by a planner. In order to diagnose faulty resources (e.g., modules) in such production systems, a diagnosis component of the control system guides the planner to preferentially execute plans that can gain information to narrow down the set of suspected modules and pinpoint the faulty resources. The present disclosure presents problem formulations and solver components used to select the plans in the control system, in which diagnosis tasks are translated to appropriate logical encodings or problem formulations (e.g. CNF, DNNF, BDD, PI, NNF, HTMS, etc.) which capture all possible bounded length plans. The formulation is then solved by a solver and the solution is translated into a plan defining a series of actions within the production plant to implement a given production goal or goals, while also advancing one or more diagnostic goals. In certain embodiments, moreover, standard off-the-shelf SAT solvers may be employed in connection with SAT formulations to address these on-line diagnostic goals, where the planner submits a SAT query for the solver to find a plan that uses a certain set of modules, such as a subset of a group of modules suspected of being faulty. In this manner, the control system can advance the knowledge by enhancing the amount of information to be gained by each plan execution while still implementing production goals in the plant.

Figure 2:
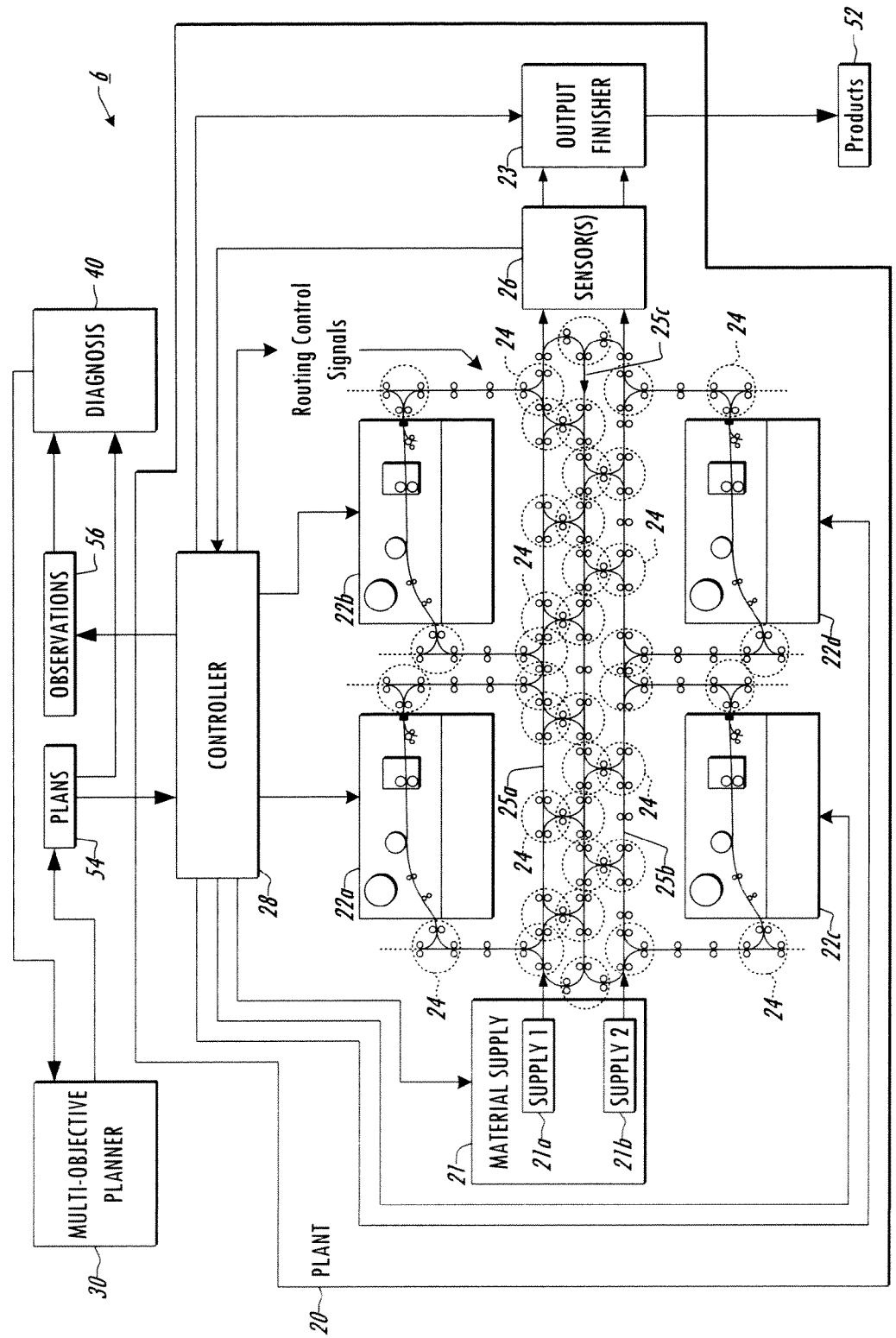
FIG. 2 is a schematic diagram illustrating further details of an exemplary modular printing system plant in the production system of FIG. 1.
Figure 3:
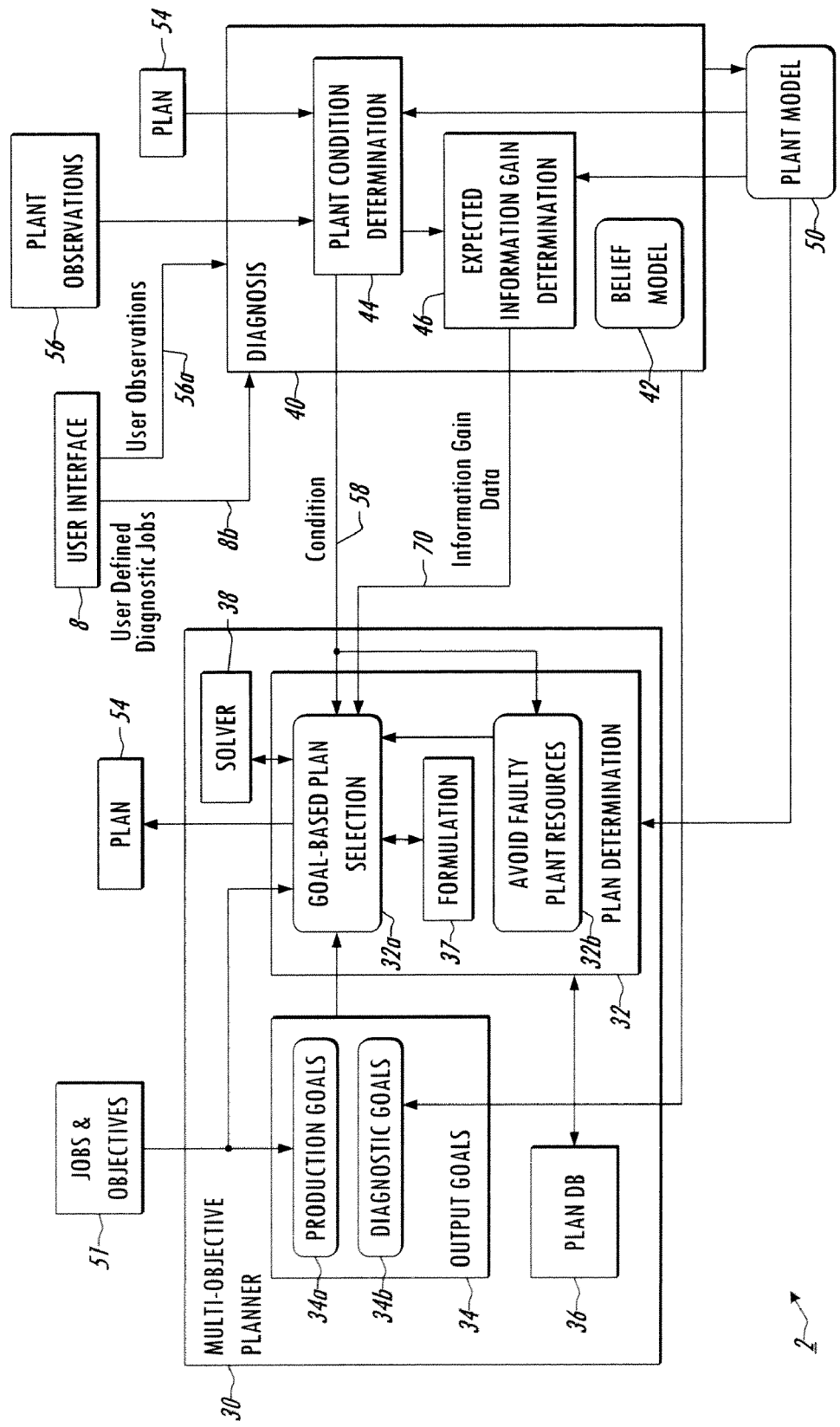
FIG. 3 is a schematic diagram illustrating further details of the exemplary planner and diagnosis component in the control system of FIGS. 1 and 2.

FIGS. 1-3 illustrate an exemplary system 1 in which the various aspects of the present disclosure may be implemented. As best shown in FIG. 1, a production system 6 is illustrated including a producer component 10 that receives production jobs 49 from a customer 4 and a plant 20 having a plurality of resources 21-24 that may be actuated or operated according to one or more plans 54 so as to produce one or more products 52 for provision to the customer 4 by the producer 10, where 'producing' products can include modifying products, objects, etc., including without limitation packaging or wrapping products. FIG. 2 illustrates further details of one exemplary plant 20 and FIG. 3 shows additional details regarding the exemplary model-based control system 2. The producer 10 manages one or more plants 20 which actually produce the output products 52 to satisfy customer jobs 49. The producer 10 in this embodiment provides jobs and objectives 51 to a multi-objective planner 30 of the model-based control system 2 and the production system 6 receives plans 54 from the planner 30 for execution in the plant 20. The jobs 54 can include one or both of production and diagnostic goals. As shown in FIG. 1, the control system 2 further includes a plant model 50 with a model of the plant 20, and a diagnosis component 40 with a belief model 42. The diagnosis component 40 determines and updates a current plant condition 58 via a plant condition estimation/updating component 44 (FIG. 3) based on one or more previously executed plans 54, corresponding observations 56 from the plant 20, and the model 50. The diagnosis component 40 also provides expected information gain data 70 to the planner 30 for one or more possible plans 54 based on the current plant condition 58 and the model 50.

The model-based control system 2 and the components thereof may be implemented as hardware, software, firmware, programmable logic, or combinations thereof, and may be implemented in unitary or distributed fashion. In one possible implementation, the planner 30, the diagnosis component 40, and the model 50 are software components and may be implemented as a set of sub-components or objects including computer executable instructions and computer readable data executing on one or more hardware platforms such as one or more computers including one or more processors, data stores, memory, etc. The components 30, 40, and 50 and sub components thereof may be executed on the same computer or in distributed fashion in two or more processing components that are operatively coupled with one another to provide the functionality and operation described herein. Likewise, the producer 10 may be implemented in any suitable hardware, software, firmware, logic, or combinations thereof, in a single system component or in distributed fashion in multiple interoperable components. In this regard, the control system 2 may be implemented using modular software components (e.g., the model 50, the planner 30, the formulation 37 and solver 38, the diagnosis component 40 and/or sub-components thereof) to facilitate ease of debugging and testing, the ability to plug state of the art modules into any role, and distribution of operation over multiple servers, computers, hardware components, etc.

The embodiment of FIG. 1 also includes an optional operator interface 8 implemented in the computer or other platform(s) on which the other components of the control system 2 are implemented, although not a strict requirement of the disclosure, wherein the operator interface 8 may alternatively be a separate system operatively coupled with the control system 2. The exemplary operator interface 8 is operatively coupled with the diagnosis component 40 to provide operator observations 56a to the diagnosis component 40, with the diagnosis component 40 determining the current plant condition 58 based at least partially on the operator observations 56a in certain implementations. Moreover, the exemplary operator interface 8 allows the operator to define a diagnostic job 8b using a diagnosis job description language 8a, and the diagnosis component 40 may provide diagnostic jobs 60 to the producer 10. The diagnosis component 40 in this implementation is operative to selectively provide one or more self-generated diagnostic jobs 60 and/or operator defined diagnostic jobs 8b to the producer 10, which in turn provides jobs and objectives 51 to the planner 30.

Referring also to FIGS. 2 and 3, the planner 30 provides one or more plans 54 to the production system 6 for execution in the plant 20 based on at least one output objective 34 (FIG. 3) and production goals as directed by the incoming jobs 51 from the producer 10. As shown in FIG. 3, the planner 30 selectively factors in one or more output objectives/goals 34 derived from the jobs and objectives 51 in constructing plans 54, including production objectives 34a and diagnostic objectives/goals 34b. In one possible implementation, the production objectives/goals 34a are created and updated according to the jobs and objectives 51 obtained from the production system 6, and the diagnostic objectives 34b are derived from and updated according to the current plant condition 58 and the expected information gain data 70 provided by the diagnosis component 40. The production objectives 34a in one implementation may relate to the scheduling of orders for produced products 52 (FIG. 1), and may include prioritization of production, minimization of inventory, and other considerations and constraints driven in large part by cost and customer needs. Examples of production objectives 34a include prioritizing plan construction/generation with respect to achieving a given product output goal (simple production criteria) as well as a secondary consideration such as simple time efficient production, cost efficient production, and robust production. For instance, cost efficient production objectives 34a will lead to construction/generation of plans 54 that are the most cost efficient among the plans that met the production goal as dictated by the jobs 51 received from the producer 10. The diagnostic objectives 34b may include objectives related to determining preferred action sequences in generated plans 54 for performing a given production-related task, minimization of maintenance and repair costs in operation of the plant 20, identifying resources 21-24 causing intermittent or persistent faults, and for giving maximum information to identify the potential failures etc.

As further shown in FIG. 3, the control system 2 may optionally include a plan data store or database 36 used to store plans 54 selectable by the planner 30 for execution in the plant 20 to facilitate one or more production or diagnostic objectives 34, wherein construction/generation of a plan 54 as used herein can include selection of one or more pre-stored plans 54 from the data store 36. In this regard, the planner 30 can selectively re-order a job queue so as to improve the likelihood of information gain. Although illustrated as integral to the planner 30, the plan data store 36 may be provided in a separate component or components that are operatively coupled with the planner 30 by which the planner 30 can obtain one or more plans 54 (whole and/or partial) therefrom. Alternatively or in combination, the planner 30 can synthesize (e.g. construct or generate) one or more plans 54 as needed, using the plant model 50 and information from the producer 10 and diagnosis component 40 to determine the states and actions required to facilitate a given production and/or diagnostic objectives 34.

In operation, the planner 30 creates and provides plans 54 for execution in the plant 20. The plans 54 include a series of actions to facilitate one or more production and/or diagnostic objectives 34 while achieving a production goal according to the jobs 51, where a given action may appear more than once in a given plan. The actions are taken with respect to states and resources 21-24 defined in the model 50 of the plant 20, for example, to route a given substrate through a modular printing system 20 from a starting state to a finished state as shown in FIG. 2. In operation, the planner 30 generates or constructs a plan 54 that will achieve a given production goal at least partially based on a diagnostic objective 34b and the expected information gain data 70 from the diagnosis component 40. The planner 30 in the illustrated embodiment includes a goal-based plan construction component 32 that assesses the current plant condition 58 from the diagnosis component 40 in generating a plan 54 for execution in the plant 20. The component 32 may also facilitate identification of faulty components 21-24 or sets thereof in constructing the plans 54 based on observations 56 and current plant conditions 58 indicating one or more plant components 21-24 as being suspected of causing system faults.

Figure 4:
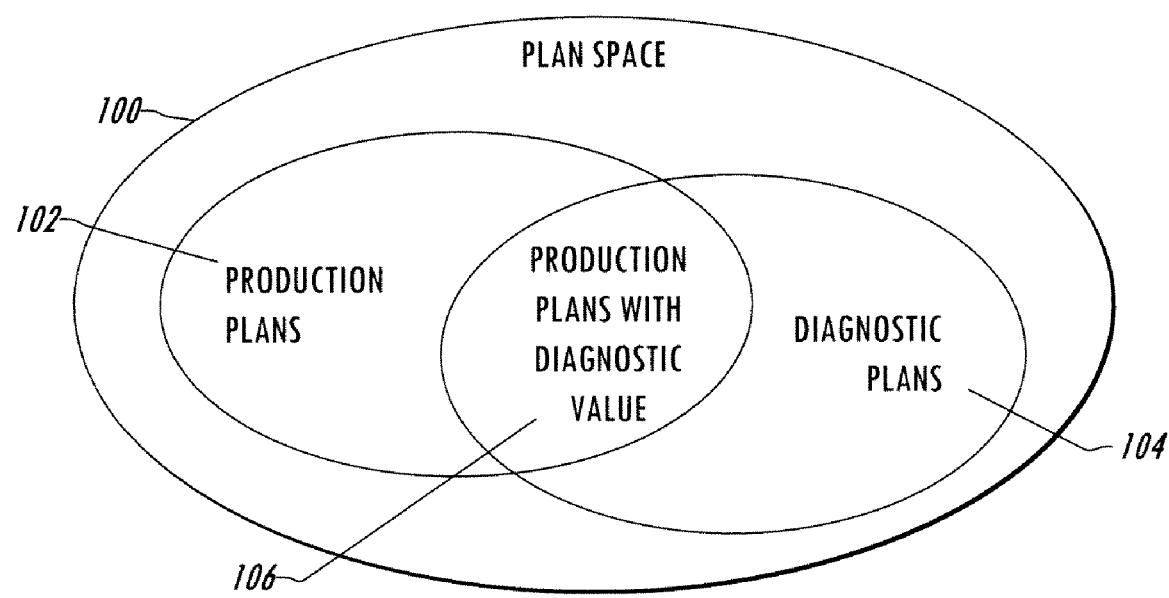
FIG. 4 is a schematic diagram illustrating a plan space for a production system, including production and diagnostic plans.

Referring also to FIG. 4, the presently disclosed intelligent plan construction techniques advantageously provide for generation of plans 54 for execution in the plant 20 within a plan space 100 that includes both production plans 102 and diagnostic plans 104. As seen in the diagram of FIG. 4, the union of the plan sets 102 and 104 includes production plans 106 that have diagnostic value (e.g., can facilitate one or more diagnostic objectives 34b in FIG. 3), wherein the planner 30 advantageously utilizes information from the diagnosis component 40 to preferentially construct and select plans 106 that achieve production goals while obtaining useful diagnostic information in accordance with the diagnostic objectives 34b. The intelligent plan construction aspects of the present disclosure thus integrate the production planning and diagnosis to facilitate the acquisition of more useful diagnostic information compared with conventional passive diagnostic techniques without the down-time costs associated with conventional dedicated diagnostics. The diagnostic information gained, in turn, can be used to improve the long term productivity of the system 6, thereby also facilitating one or more production objectives 34a (FIG. 3).

As further illustrated in FIG. 3, the exemplary diagnosis component 40 includes a belief model 42 representing the current state of the plant 20, and a component 44 that provides the current condition of the plant 20 to the planner 30 based on the previously executed plan(s) 54 and corresponding plant observations 56. The component 44 also estimates and updates the plant condition of the belief model 42 according to the plant observations 56, the plant model 50, and the previously executed plans 54. The operator observations 56a from the interface 8 may also be used to supplement the estimation and updating of the current plant condition by the component 44. The estimation/updating component 44 provides the condition information 58 to inform the planner 30 of the confirmed or suspected condition of one or more resources 21-24 or other components of the plant 20 (FIG. 1). This condition information 58 may be considered by the plan construction component 32, together with information about the plant 20 from the plant model 50 in providing plans 54 for implementing a given production job or goal 51, in consideration of production objectives 34a and diagnostic objectives 34b. The diagnosis component 40 also includes a component 46 that provides expected information gain data 70 to the planner 30 based on the model 50 and the belief model 42. The information gain data 70 may optionally be determined in consideration of the operator defined diagnostic jobs 8b from the operator interface 8.

FIG. 2 illustrates further details of an exemplary modular printing system plant 20 in the production system 6, including material supply component 21 that provides printable sheet substrates from one of two supply sources 21a and 21b, a plurality of print or marking engines 22, an output finisher station 23, a modular substrate transport system including a plurality of bidirectional substrate transport/router components 24 (depicted in dashed circles in FIG. 2), one or more output sensors 26 disposed between the transport system 24 and the finisher 23, and a controller 28 providing control signals for operating the various actuator resources 21-24 of the plant 20. The exemplary printing system plant 20 includes four print engines 22a, 22b, 22c, and 22d, although any number of such marking engines may be included, and further provides a multi-path transport highway with three bidirectional substrate transport paths 25a, 25b, and 25c, with the transport components 24 being operable by suitable routing signals from the controller 28 to transport individual substrate sheets from the supply 21 through one or more of the marking engines 22 (with or without inversion for duplex two-side printing), and ultimately to the output finishing station 23 where given print jobs are provided as output products 52. Each of the printing engines 22, moreover, may individually provide for local duplex routing and media inversion, and may be single color or multi-color printing engines operable via signals from the controller 28. The model-based control system 2 may, in certain embodiments, be integrated into the plant controller 28, although not a strict requirement of the present disclosure.

Referring now to FIGS. 1-3, in operation, the planner 30 automatically generates plans 54 representing a series of actions for component resources 21-24 of the printing system plant 20 derived from the incoming jobs 51 in consideration of one or more production objectives 34a and diagnostic objectives 34b. In particular, when the plant 20 has flexibility in how the output goals can be achieved (e.g., in how the desired products 52 can be created, modified, packaged, wrapped, etc.), such as when two or more possible plans 54 can be used to produce the desired products 52, the diagnosis component 40 can alter or influence the plan construction operation of the planner 30 to generate a plan 54 that is expected to yield the most informative observations 56. The constructed plan 54 in this respect may or may not compromise short term production objectives 34a (e.g., increases job time or slightly lowers quality), but production nevertheless need not be halted in order for the system to learn. The additional information gained from execution of the constructed job 54 can be used by the producer 10 and/or by the planner 30 and diagnosis component 40 to work around faulty component resources 21-24, to schedule effective repair/maintenance, and/or to further diagnose the system state (e.g., to confirm or rule out certain system resources 21-24 as the source of faults previously detected by the sensor(s) 26). In this manner, the information gleaned from the constructed plans 54 (e.g., plant observations 56) can be used by the estimation and updating component 44 to further refine the accuracy of the current belief model 42.

Moreover, where the plant 20 includes only limited sensing capabilities, (e.g., such as the system in FIG. 2 having only sensors 26 at the output of the transport system 24 downstream of the printing engines 22), passive diagnosis techniques are unable to unambiguously identify every possible fault in the system 20, whereas direct diagnostic efforts lead to system down-time and the associated cost in terms of productivity. The control system 2 of the present disclosure, on the other hand, advantageously facilitates selective employment of intelligent on-line diagnosis though construction and execution of plans 54 that provide enhanced diagnostic information according to the plant condition 58 and/or the expected information gain 70, and may further advantageously facilitate generation of one or more dedicated diagnostic plans 54 for execution in the plant 20 based on at least one diagnostic objective 34b and the plant condition 58, and for intelligent interleaving of dedicated diagnostic plans 54 and production plans 54 based on production and diagnostic objectives 34 according to the current plant condition 58. In particular, the planner 30 can cause execution of explicit diagnostic plans 54 that involve halting production when the information gained from the plan 70 is expected to lead to significant future gains in productivity, enhanced ability to identify faulty resources 21-24, or other long term productivity objectives 34a and/or diagnostic objectives 34b.

Even without utilizing dedicated diagnostic plans 54, moreover, the control system 6 significantly expands the range of diagnosis that can be done online through pervasive diagnostic aspects of this disclosure during production (e.g., above and beyond the purely passive diagnostic capabilities of the system), thereby lowering the overall cost of diagnostic information by mitigating down time, the number of service visits, and the cost of unnecessarily replacing components 21-24 in the system 20 that are actually working, without requiring complete sensor coverage. The planner 30 is further operative to use the current plant condition 58 in making a tradeoff between production objectives 34a and diagnostic objectives 34b in generating plans 54 for execution in the plant 20, and may also take the current plant condition 58 into account in performing diagnosis in isolating faulty resources 21-24 in the plant 20.

The plant condition estimation and updating component 44 of the diagnosis component 40 infers the condition of internal components 21-24 of the plant 20 at least partially from information in the form or observations 56 derived from the limited sensors 26, wherein the diagnosis component 40 constructs the plant condition 58 in one embodiment to indicate both the condition (e.g., normal, worn, broken) and the current operational state (e.g., on, off, occupied, empty, etc.) of the individual resources 21-24 or components of the plant 20, and the belief model 42 can be updated accordingly to indicate confidence in the conditions and/or states of the resources or components 21-24. Thus, the plant condition 58 and the belief model 42 may advantageously indicate which resources 21-24 are suspected of being faulty, and may include fault probability information for one or more of the plant resources 21-24.

In operation, once the producer 10 has initiated production of one or more plans 54, the diagnosis component 40 receives a copy of the executed plan(s) 54 and corresponding observations 56 (along with any operator-entered observations 56a). The condition estimation and updating component 44 uses the observations 56, 56a together with the plant model 50 to infer or estimate the condition 58 of internal components/resources 21-24 and updates the belief model 42 accordingly. The inferred plant condition information 58 is used by the planner 30 to directly improve the productivity of the system 20, such as by selectively constructing plans 54 that avoid using one or more resources/components 21-24 known (or believed with high probability) to be faulty, and/or the producer 10 may utilize the condition information 58 in scheduling jobs 51 to accomplish such avoidance of faulty resources 21-24. The exemplary diagnosis component 40 also provides future prognostic information to update the diagnostic objectives 34b which may be used by the planner 30 to spread utilization load over multiple redundant components 21-24 to create even wear or to facilitate other long term objectives 34.

To improve future productivity, moreover, the diagnosis component 40 provides the data 70 to the planner 30 regarding the expected information gain of various possible production plans 54. The planner 30, in turn, can use this data 70 to construct production plans 54 that are maximally diagnostic (e.g., most likely to yield information of highest diagnostic value). In this manner, the planner 30 can implement active diagnostics or active monitoring by using carefully generated or modified production plans 54 to increase information during production (e.g., using 'diagnostic' production plans). Moreover, certain diagnostic plans 54 are non-productive with respect to the plant 20, but nevertheless may yield important diagnostic information (e.g., operating the transport mechanisms 24 in FIG. 2 such that all the substrate transport paths 25a, 25b, and 25c go in the backward direction away from the output finisher 23). Within this space of plans 54 that do not accomplish any production goals, the operator interface 8 allows an operator to create diagnostic jobs 8b via the job description language 8a, and the diagnosis component 40 may also include a diagnosis job description language to generate dedicated/explicit diagnostic jobs 60 which are provided to the producer 10. The producer 10 may then provide these jobs 60 to the planner 30 along with the other jobs and objectives 51 to explicitly request the planner 30 to advance diagnostic objectives 34b. The producer 10 in one implementation may operate a job queue that queues requested customer and diagnostic jobs 49, 60 and the producer 10 receives component condition updates 58 from the diagnosis component 40. The producer 10 uses the condition 58 to choose between customer jobs 49 and diagnosis jobs 60, to tradeoff production efficiency versus diagnostic value in production plans 54, and to merge (e.g., interleave) customer jobs 49 and dedicated diagnostic jobs 60 when they are compatible and wherein the scheduling thereof can facilitate one or more diagnostic and production objectives or goals 34. The diagnosis component 40 can also provide prognostic information to the planner 30 to help improve the quality of the plans 54 with respect to certain criteria. For example, the planner 30 (e.g., and/or the producer 10) is operative to selectively use fault state information to construct from multiple suitable production plans 54 based on the prognosis of plan alternatives for "robust printing" to distribute workload evenly across different resources 21-24 in order to reduce the frequency of scheduled or unscheduled maintenance of the plant 20.

Figure 12:
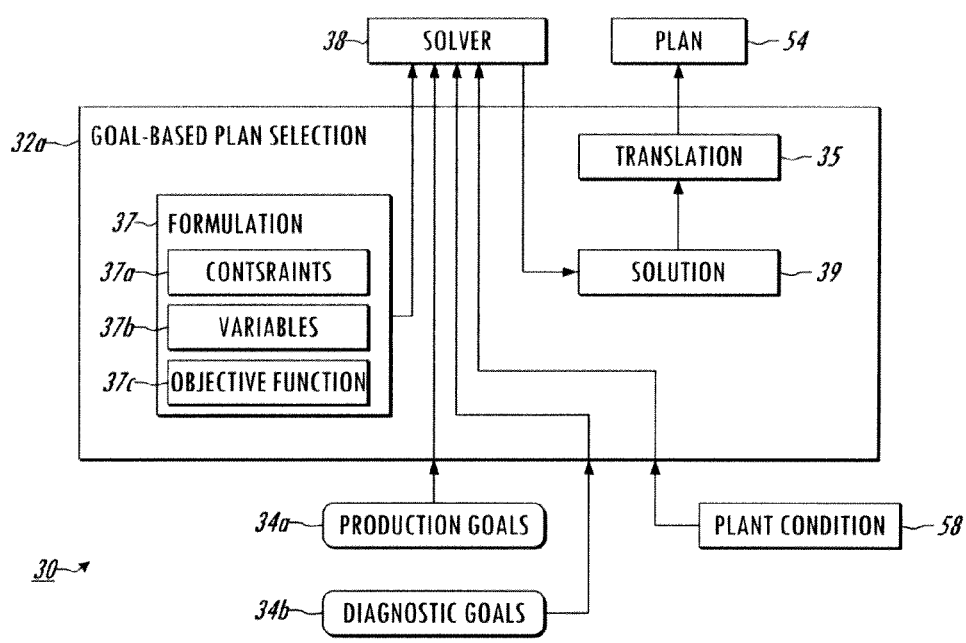
FIG. 12 is a schematic diagram illustrating further details of the exemplary formulation and solver-based techniques in the system of FIGS. 1-3 in accordance with various aspects of the present disclosure.

Referring to FIGS. 1-3 and 12, in accordance with one or more aspects of the present disclosure, a formulation 37, such as a CNF formulation, is generated to represent all possible plans with fixed bound on plan length (i.e. sequence of bounded length executable actions by the system 6 that can lead from the initial state to the desired goal state). The length measure can be interpreted as either the number of actions in the plan/action-sequence or the number of time-steps in the plan/action-sequence, where multiple actions can be executed in parallel in each time-step. As best shown in FIG. 12, the planner 30 includes the formulation 37 representing actions that can possibly be executed at different time steps, and thus captures all possible plans with a bounded length, in the plant 20 including constraints 37a and variables 37b for each action to transition the plant 20 from a starting state $402s$ to a goal state $402g$ defined by one or more production goals 34a. The variables 37b represent actions that can be executed at different time steps and the state variables that may be true at each time step, depending on which actions are selected to execute at the previous time step. The constraints 37a represent the relations between action variables in the same time step and the relations between actions and their preconditions and effects at the adjacent time steps. The objective functions 37c are the desirable properties of the plans that transition from the initial to the goal state. A solver 38, such as a SAT solver in one embodiment operates to provide one or more solutions 39 to the formulation 37 based at least partially on the production goal(s) 34a, the diagnostic goal(s) 34b, and the current plant condition 58. The planner 30 further includes a translation component 35 that translates the solution 39 into a plan 54 and provides the plan 54 to the plant 20 for execution. The formulation 37 in one embodiment includes one or more constraints 37a to be enforced by the solver 38 to ensure that a resource variable is TRUE if-and-only-if some action that uses that resource 21-24 is executed. This in return can be used by the objective functions 37c if those objective functions are related to resource usages.

The plan selection component 32a queries the SAT solver 38 to solve the encoding 37, and the solver 38 returns one among all the possible plans 54 that satisfy the constraints 37a. In order to advance one or more diagnostic goals 34b, the plan selection component 32a attempts to reduce the set of suspect modules indicated by the belief model 42 and the current plant condition 58 provided by the diagnosis component 40. In selecting a set of resources 21-24 and associated actions for the next plan 54, the planner 30 in one embodiment uses the solver 38 and the formulation 37, along with the current plant condition 58 and the production and diagnostic goals 34a, 34b by employing a maximizing entropy heuristic by selecting a set of resources 21-24 that includes as close as possible to half of the resources 21-24 suspected of being faulty. To do this, the formulation 37 includes an objective function 37c, which asserts the set of resource used by actions in a given plan, evaluated by the solver 38 to evaluate plans 54 (solutions 39) that can achieve the production goal(s) 34a. Once the solver 38 provides the solution 39, this is translated into a plan 54 by the translation component 35 and the plan 54 is executed in the plant 20.

Sensor feedback from plan execution (plant observations 56) indicate whether the plan 54 failed or succeeded, from which information the diagnosis component 40 can narrow down the list of suspected resources 21-24 and thus update the believe model 42. In one embodiment, appropriate formulas 37c or constraints 37a are then added to the formulation to reflect those changes. In another embodiment, the updated condition 58 indicates the updated set of suspected resources 21-24 and is provided to the planner 30, from which the solver 38 provides the next solution 39 in accordance with the objective function(s) 37c. The process continues until the set of suspected resources 21-24 cannot be further reduced, by which the use of the formulation 37 and the solver 38 advances the diagnostic goals 34b by helping to identify the resource or resources 21-24 that are causing detected faults. As this process is on-line, moreover, the formulation 37 and solver 38 also facilitate the production goal(s) 34a by performing the production planning and plan execution without interruption of production in the system.

The solver 38 in one embodiment is a SAT solver, where the constraints 37a and variables 37b for each plant state are Boolean. In this case, the current plant condition 58 includes an indication of which plant resources 21-24 are suspected of being faulty and the formulation 37 includes an objective function 37c evaluating the number of plant resources 21-24 suspected of being faulty that are used in a given solution. The formulation 37, moreover, may include an objective function 37c evaluating the number of plant resources 21-24 suspected of being faulty that are used in a given solution 39, and the planner 30 selects at least one solution 39 for which number of suspected resources 21-23 used in the solution 39 is closest to half of the suspected plant resources 21-23. In this regard, the formulation 37 can be a conjunctive normal form (CNF) formulation, a decomposable disjunctive negation form (DNNF) formulation, a binary decision diagram (BDD) formulation, a programmed instruction (PI) formulation, a negation normal form (NNF) formulation, a hybrid truth maintenance system (HTMS) formulation, etc. Other embodiments are possible in which the formulation is created using other encodings such as constraint satisfaction problem (CSP), constraint satisfaction optimization problem (CSOP), linear programming (LP), integer linear programming (ILP), etc. In this regard, the objective function 37c may evaluate fault probabilities of plant resources 21-24, and the planner 30 may operate to select at least one solution 39 based at least partially on the fault probabilities and the solver 38 need not be a SAT solver but may alternatively be a CSP, CSOP, LP, or ILP solver.

Figure 5:
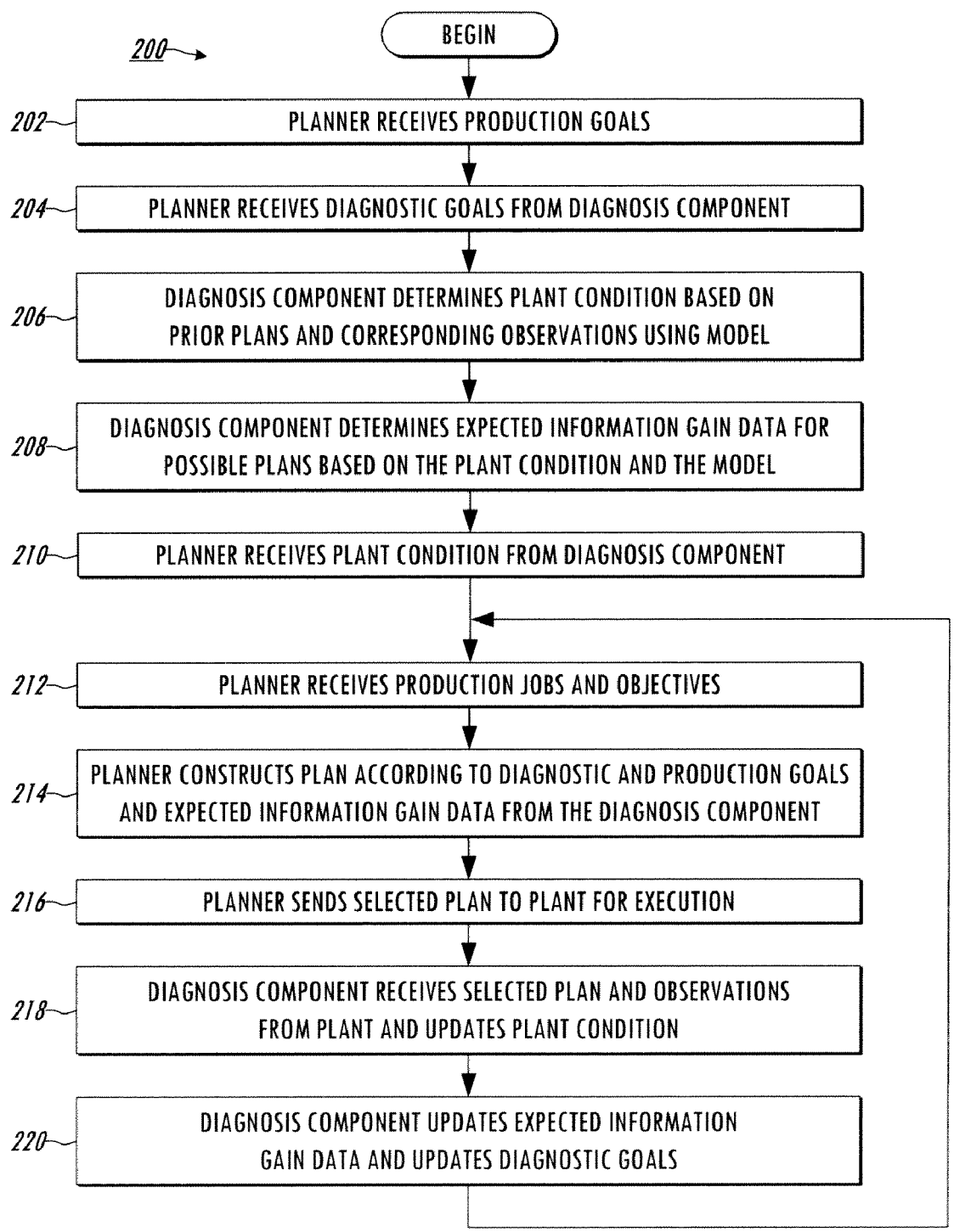
FIG. 5 is a flow diagram illustrating an exemplary method for constructing plans for execution in a production system in accordance with one or more aspects of the present disclosure.
Figure 6:
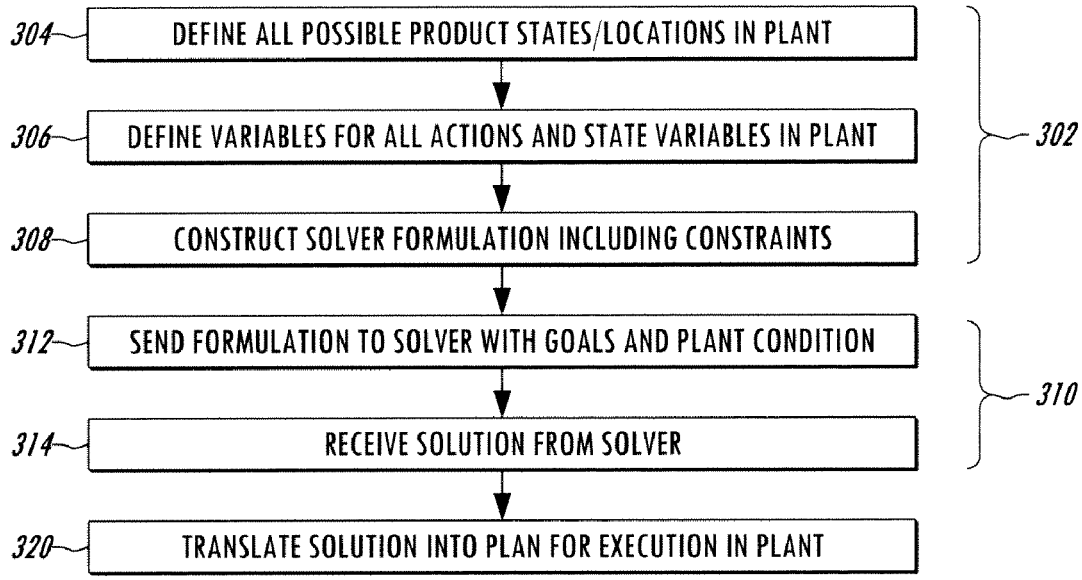
FIG. 6 is a flow diagram illustrating an exemplary method of evaluating and generating plans for execution in the plant using a formulation and a solver in accordance with the disclosure.

Referring also to FIGS. 5 and 6, exemplary methods 200 and 300 are illustrated for constructing plans 54 for execution in a production system 6 with a plant 20 having a plurality of resources 21-24 to achieve one or more production goals 34a. While the methods 200, 300 are illustrated and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods 200 and 300 of the disclosure may be implemented in hardware, software, or combinations thereof, such as in the exemplary control system 2 described above, and may be embodied in the form of computer executable instructions stored in a computer readable medium, such as in a memory operatively associated with the control system 2 in one example.

Production goals 34a and diagnostic objectives 34b are received at 202 and 204 in the method 200. A current plant condition 58 is determined in the diagnosis component 40 at 206 based at least partially on a previously executed plan 54 and at least one corresponding observation 56 from the plant 20 using a plant model 50, and expected information gain data 70 is determined at 208 based on the current plant condition 58 and the model 50. The planner 30 receives the plant conditions 58 at 210 from the diagnosis component 40, and the planner 30 receives production jobs and objectives 51 at 212 from the producer 10. At 214, the planner 30 constructs a plan 54 based at least partially on a diagnostic objective 34b and the expected information gain data 70. At 216, the planner 30 sends the constructed plan 54 to the plant 20 for execution and the diagnosis component 40 receives the plan 54 and the plant observations 56 at 218. At 220, the diagnosis component 40 updates the plant condition 58 and updates the expected information gain data 70, after which further jobs and objectives 51 are serviced and the process 200 continues again at 212 as described above.

The plan construction at 214 may be based at least partially on the current plant condition 58, and may include making a tradeoff between production objectives 34a and diagnostic objectives 34b based at least partially on the current plant condition 58. Moreover, the plan construction at 214 may include performing prognosis to isolate faulty resources 21-24 in the plant 20 based at least partially on the current plant condition 58. In certain embodiments, a dedicated diagnostic plan 54 may be constructed for execution in the plant 20 based at least partially on at least one diagnostic objective 34b, a diagnostic job 60, 8b, and the current plant condition 58, and the plan construction may provide for selectively interleaving dedicated diagnostic and production plans 54 based on at least one production objective 34a and at least one diagnostic objective 34b. Further embodiments of the method 200 may also include allowing an operator to define a diagnostic plan 8b using a diagnosis job description language 8a and receiving operator observations 56a, with the plan selection/generation at 216 being based at least partially on the operator observations 56a.

FIG. 6 illustrates further details of a formulation/solver approach to the plan constructions at 214 of FIG. 5. At 302 in FIG. 6, a formulation 37 is provided representing possible actions in the plant 20 including constraints 37a between actions and between actions and state variables and variables 37b representing all actions in the formulation and all state variables within the bounded plan length to transition the plant 20 from a starting state 402s to a goal state 402g (FIG. 7 below) defined by at least one production goal 34a. At 304 of the plan construction, all possible product locations and resource states are defined in the plant 20, and variables are defined at 306 for all the system actions and state variables. A solver formulation is constructed at 308 including the variables 37b and constraints 37c. The formulation 37, moreover, may be constructed at 308 to include one or more objective functions 37c. The method 300 also provides for solving the formulation 37 at 310 to provide at least one solution 39 to the formulation 37 based at least partially on at least one production goal 34a, at least one diagnostic goal 34b, and the current plant condition 58. In the illustrated embodiment, the formulation 37 is sent to the solver 38 at 312 (such as in a SAT solver query), and the solution is received at 314 from the solver 38. In one possible embodiment, the solution at 310 includes evaluating an objective function 37c based on the number of plant resources 21-24 suspected of being faulty that are used in a given solution 39, and selecting a least one solution 39 for which number of suspected resources 21-24 used in the solution 39 is closest to half of the suspected plant resources 21-24. This embodiment is suitable for Boolean formulations 37 and solvers 38. In another possible embodiment, solving the formulation 37 at 310 further includes evaluating an objective function 37c with respect to fault probabilities of plant resources 21-24, as well as selecting at least one solution 39 based at least partially on the fault probabilities. The solution is then translated at 320 into a plan 54, which is then provided (216 in FIG. 5) to the plant 20 for execution.

In accordance with further aspects of the present disclosure, a computer readable medium is provided, which has computer executable instructions for performing the steps of determining a current plant condition 58 based at least partially on a previously executed plan 54, at least one corresponding observation 56 from the plant 20, and a plant model 42. The medium also includes computer executable instructions for providing a formulation 37 representing possible actions in the plant 20 including constraints 37a and variables 37b for each action to transition the plant 20 from a starting state 402s to a goal state 402g defined by at least one production goal 34a, and for solving the formulation 37 to provide at least one solution 39 to the formulation 37 based at least partially on at least one production goal 34a, the at least one diagnostic goal 34b, and the current plant condition 58. Further instructions are provided for translating the solution 39 into a plan 54 and providing the plan 54 to the plant 20 for execution. In one embodiment of the computer readable medium, the computer executable instructions for solving the formulation 37 include computer executable instructions for evaluating an objective function 37c based on the number of plant resources 21-24 suspected of being faulty that are used in a given solution 39, and for selecting at least one solution 39 for which number of suspected resources 21-24 used in the solution 39 is closest to half of the suspected plant resources 21-24. In another embodiment, the computer readable medium includes computer executable instructions for evaluating an objective function 37c with respect to fault probabilities of plant resources 21-24, and selecting at least one solution 39 based at least partially on the fault probabilities.

By the above-described approaches, the control system 2 implements efficient on-line active or pervasive diagnosis in controlling the plant 20 through a combination of model-based probabilistic inference in the diagnosis component 40 with decomposition of the information gain associated with executing a given plan 54 using an efficient heuristic target search in the planner 30. In this active diagnosis technique, specific inputs or control actions in the form of plans 54 are constructed by the planner 30 with the help of the diagnosis component 40 to maximize or increase the amount and/or quality of diagnostic information obtained from the controlled system plant 20. In the context of the exemplary modular printing system plant 20 of FIG. 2, the planner 30 operates to construct the sequence of actions (plan 54) that transfers substrate sheets through the system 20 to generate a requested output for a given print job (e.g. to satisfy a production goal), using pervasive diagnosis to aid in plan construction. One particular production objective 34a in this system 20 is to continue printing even if some of the print engines 22 fail or some of the paper handling modules 24 fail or jam. In this exemplary modular printing system example 20, moreover, there are only output type sensors 26 preceding the finisher 23, and as a result, a plan 54 consisting of numerous actions must be executed before a useful observation 56 can be made. The diagnostic component 40 updates its belief model 42 and the current condition 58 to be consistent with the executed plan 54 and the observations 56. The diagnosis component 40 forwards updated condition information 58 and the expected information gain data 70 to the planner 30. The model 50 describes the plant system 20 as a state machine with all possible actions A that the plant 20 can accommodate. Actions are defined by preconditions and post-conditions over the system state. As such, an action requires the system 20 to be in a certain state in order to be executable and modifies the system state when executed. The system 20 is controlled by plan p (54) that is comprised of a sequence of actions $a_1, a_2, \ldots, a_n$ drawn from the set A of possible actions. Execution of an action potentially changes the system state, and part of the system state may represent the state of a product 52 at any given time, particularly if the action is part of a production plan 54. Further, internal constraints of the system 54 limit the set of plans 54 to a subset of all possible sequences (e.g., the plan space 100 in FIG. 4 above). Moreover, the execution of actions of a given plan p in the system 20 may result in only a single observable plan outcome or observation O (e.g., observation 56 from sensor 26).

Figure 7:
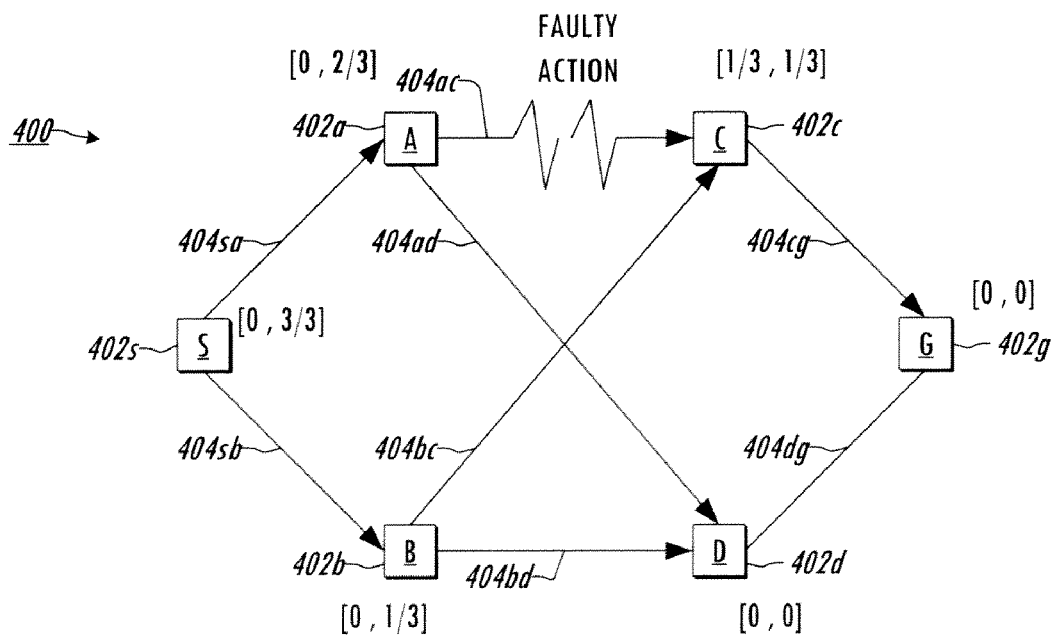
FIG. 7 is a schematic diagram illustrating an exemplary state/action diagram showing possible plans for transitioning the system state from a starting state to a goal state.

FIG. 7 illustrates an exemplary state/action diagram 400 depicting possible plans in the plant 20 for transitioning the system state from a starting state S to a goal state G. In this example, the system state nodes 402 include the starting state S 402s, the goal stage G 402g, and four intermediate states 402a-402d for nodes A-D, respectively. A given plan 54 for this example proceeds by following actions 404 through the diagram 400 to ultimately reach the goal G 402g. One possible plan 54 that satisfies such a production goal moves the system through the state sequence [S, A, C, G] through actions 404sa, 404ac, and 404cg as shown in FIG. 7. Assuming for illustrative purposes that this plan 54 results in an abnormal outcome (fault or failure) caused by a faulty action 404ac between nodes A and C (action $a_{A,C}$), due to a single persistent fault in one of the system resources 21-24, the diagnosis component 40 would determine from the plan 54 and the resulting fault observation 56 that all of the actions 404sa, 404ac, and 404cg and the associated system resources 21-24 used along the plan path are (without further information) suspected of being faulty. Assuming a single persistent fault, there are three positive probability hypotheses corresponding to the suspected actions $\{\{a_{S,A}\}, \{a_{A,C}\}, \{a_{C,G}\}\}$. Absent additional information, the diagnosis component 40 in one embodiment initially assigns equal probabilities $\{\frac{1}{3}\}$, $\{\frac{1}{3}\}, \{\frac{1}{3}\}$ to these suspected actions/resources.

The solver 38 uses the graph structure embodied in the formulation 37 and probability estimates provided by the diagnosis component 40 to solve the formulation 37 and its objective function(s) 37c to provide the solution 39 that can be translated into a plan 54 for execution in the plant 20. In the example shown in FIG. 7, the diagnosis component 40 assigns lower and upper bounds [L,U] to the nodes 402, and these bound values are sent to the planner 30 as part of the current system condition 58. As an illustrative example, the action $a_{D,G}$ leading from state D to the goal state G in FIG. 7 was not part of the observed plan 54 that failed, and is therefore not a candidate hypothesis, and this action has a zero probability of being the source of the assumed single persistent system fault. In this example, moreover, there are no other possible plans 54 from D to G, so both the upper and lower bound for any plan ending in state D is zero, and the node D is thus labeled [0,0] in FIG. 7. Likewise, State B 402b has a lower bound of zero as plans 54 passing through state B can be completed by an action $a_{B,D}$ 404bd that does not use a suspected action 404 and ends in state D which has a zero lower bound. State B in this example has an upper bound of ⅓ since it can be completed by an unsuspected action $a_{B,C}$ 404bc to state C 402c which in turn has both upper and lower bounds with ⅓ probability of being abnormal. The diagnosis component 40 continues this analysis recursively to determine bounds on the probability of a suffix sub-plan being abnormal, and sends these as part of the information gain data 70 to the planner 30.

The planner 30 in one embodiment uses these bounds in solving the formulation to identify and construct a plan 54 that achieves or most closely approximates a target probability T. For example, one possible plan 54 begins from the start node S 402s and includes a first action $a_{S,A}$, which was part of the plan 54 that was observed to be abnormal. If the action $a_{S,A}$ 404ac is used in a plan, it will add ⅓ probability to the chance of failure as it is a suspect. After $a_{S,A}$, the plant 20 would be in state A, and a plan 54 could be completed through D by including actions 404ad and 404dg to arrive at the goal state G 402g. The action $a_{A,D}$ itself has a zero probability of being abnormal since it was not involved in the previously observed faulty plan, and thus a plan completion through state node D 402d adds zero probability of being abnormal. From node A 402a, a plan 54 could alternatively be completed through node C, as in the originally observed plan 54. The corresponding action $a_{A,C}$ 404ac adds ⅓ probability of failure to such a plan and thus adds another ⅓ probability of being abnormal. The solver 38 is provided with a formulation 37 that may include an objective function 37c that considers either or both of the suspected/exonerated status of a given resource/action in the plant 20 and/or the currently estimated/updated fault probabilities for the resources/actions.

One embodiment of the solver 38 preferentially constructs plans 54 by identifying the plan (formulation solution 39) that provides the maximum diagnostic value. In this regard, the execution of a plan 54 having the maximum uncertainty (e.g., probability of failure closest to 0.5, or the plan using close to half the currently suspected resources/actions) will be most informative as far as refining the belief model 42 of the diagnosis component 40. The solver 38 in these embodiments therefore evaluates the objective function 37 in a manner that predicts total plan abnormality probability (or the number of suspected actions/resources) for a given set of initial and goal states 402s and 402g, in the illustrated example, to move the plant 20 through the state node sequence [S, A, C, G] or [S, A, D, G]. The lower bound of the total plan is ⅓ in this case, as determined by ⅓ from $a_{S,A}$ plus 0 from the completion $a_{A,D}$, $a_{D,G}$, and the upper bound is ⅔ equal to the sum of ⅓ from $a_{S,A}$ plus ⅓ each from $a_{A,C}$ and $a_{C,G}$. If this solution is computed through [$a_{A,C}$,$a_{C,G}$] the resulting plan 54 will fail with probability 1, and therefore nothing is to be learned from constructing such a plan 54. If the solution 39 is instead completed through the suffix [$a_{A,D}$,$a_{D,G}$] the failure probability of the total plan will be ⅓ which is closer to the optimally informative probability T=0.5. In this case, the solver 38 will provide a solution representing a plan 54 [S, A, D, G] by evaluation of the objective function 37c. This plan 54 may or may not fail, and in either case something may be learned from a diagnostic perspective. For instance, if the plan [S, A, D, G] fails, the diagnosis component 40 learns that node $a_{S,A}$ was the failed action/resource (for the assumed single persistent fault scenario), and if the plan 54 is successful, the diagnostic component 40 can further refine the belief model 42 by eliminating action/resource 404sa as a fault suspect (exonerated).

It is noted that there is no guarantee that a solution exists for any given value between the bounds. The diagnosis component 40 in one embodiment recursively calculates the bounds starting from all goal states, where a goal state has an empty set of suffix plans $P_{G \to G} = \emptyset$ and therefore has a set lower bound $L_G=0$ and a set upper bound $U_G=0$. For each new state $S_m$, the diagnosis component 40 calculates the corresponding bounds based at least partially on the bounds of all possible successor states $SUC(S_m)$ and the failure probability of the connecting action $a_{Sm,Sn}$ between $S_m$ and a successor state $S_n$. In this regard, a successor state $S_n$ of a state $S_m$ is any state that can be reached in a single step starting from the state $S_m$. In the case where a single fault is assumed, the failure probability added to a plan $p_{I \to S_m}$ by concatenating an action $a_{S_m \ldots S_n}$, is independent from the plan $p_{I \to S_m}$ if $$H_{p_{I \to S_m}} \cap H_{a_{S_m,S_n}} = \phi.$$

The diagnosis component 40 determines the lower bound for $S_m$ by the action probabilities linking $S_m$ to its immediate successors and the lower bounds on these successors, and computes the upper bounds in analogous fashion with $L_{Sm} = \min_{Sn \in SUC(Sm)}[\Pr(ab(a_{Sm,Sn})) + L_{Sn}]$, and $U_{Sm} = \max_{Sn \in SUC(Sm)}[\Pr(ab(a_{Sm,Sn})) + U_{Sn}]$.

As noted above, the most informative plan 54 is one whose total failure probability is T=0.5 in a preferred implementation for an assumed persistent single fault. Given an interval describing bounds on the total abnormality probability of a plan $I(p_{I \to S_n})$, the planner 30 can therefore construct an interval describing how close the abnormality probabilities will be to T according to the equation $|T-I(p_{I \to S_n})|$. This absolute value folds the range around T, and if the estimated total abnormality probability of the plan 54 straddles target probability T, then the interval $|T-I(p_{I \to S_n})|$ straddles zero and the interval will range from zero to the absolute max of $I(p_{I \to S_n})$. The exemplary solver 38 can employ a search heuristic $F(p_{I \to S_n}) = \min(|T-I(p_{I \to S_n})|)$ from the diagnosis component 40 as part of the objective function evaluation, although other techniques are contemplated within the scope of the disclosure which allow target searching to provide a solution 39 representing a plan or plans 54 having high relative informative value. The exemplary function F has some advantageous properties. For example, whenever the predicted total plan abnormality probability lies between L and U, F is zero. Also, plans 54 may exist whose abnormality probability exactly achieves the target probability T. Moreover, in all cases $F(p_{I \to S_n})$ represents the closest any plan that goes through a state $S_n$ can come to the target abnormality probability exactly T. The solver 38 in one implementation operates to evaluate the objective function 37c for a set of solutions 39 that can provide the required production actions to move the system from the start state 402s to the goal state 402g, and from this evaluation determines the solution 39 that best achieves the objective.

The planner 30 can also facilitate the selective avoidance of known faulty resources 21-24 in the plant 20 via the component 32b, as well as generation of plans 54 so as to help determine the source of faults observed during production. For example, the planner 30 operating the above described modular printing system plant 20 of FIG. 2 can be influenced by diagnostic objectives 34b (FIG. 3) to preferentially construct paper paths via appropriate routing of substrates to use different subsets of routing and printing components 24 and 22, where a given sequence of these paths can be used to isolate the cause of an observed fault. Moreover, multiple plant pathways, redundancy of plant resources, and the capability to operate resources at different speeds, voltage levels, temperatures, or other flexibility in setting operational parameters of the plant resources allows the planner 30 to tailor active production plan generation for intelligent diagnostic information gain despite lack of complete sensor coverage in a given plant 20. In this manner, the modularity and flexibility of a given system 20 can be exploited by the pervasive diagnostic features of the control system 2 to facilitate diagnostic objectives 34b while also providing benefits with regard to flexibility in achieving production goals.

The control system 2 can thus provide the advantages of performing diagnosis functions during production, even with limited sensor capabilities, with the flexibility to schedule dedicated diagnostic plans 54 if/when needed or highly informative. In the case of explicit dedicated diagnosis, the planner 30 focuses on the needs of the diagnosis component 40 and thus creates/selects plans 54 that maximize information gain with respect to the fault hypotheses. The system 2 also allows the generation of plans 54 solely on the basis of production goals, for instance, where there is only one plan 54 that can perform a given production task and the planner 30 need not chose from a set of equivalent plans, thereby limiting the information gathering to the case of passive diagnosis for that plan.

In the exemplary modular printing system example 20 above, therefore, the control system 2 can choose to parallelize production to the extent possible, use specialized print engines 22 for specific printing tasks, and have the operational control to reroute sheet substrates around failed modules as these are identified. In this implementation, the planner 30 may receive a production print job 51 from a job queue (in the producer 10, or a queue in the planner 30), and one or more plans 54 are constructed as described above to implement the job 51. The observations 56 are provided to the diagnosis component 40 upon execution of the plan(s) 54 to indicate whether the plan 54 succeeded without faults (e.g., not abnormal), or whether an abnormal fault was observed (e.g., bent corners and/or wrinkles detected by the sensors 26 in printed substrates). The diagnosis component 30 updates the hypothesis probabilities of the belief model 42 based on the executed plan 54 and the observations 56. When a fault occurs, the planner 30 constructs the most informative plan 54 in subsequent scheduling so as to satisfy the diagnostic objectives 34b. In this regard, there may be a delay between submitting a plan 54 to the plant 20 and receiving the observations 56, and the planner 30 may accordingly plan production jobs 51 from the job queue without optimizing for information gain until the outcome is returned in order to maintain high short term productivity in the plant 20.

Using the above described pervasive diagnosis, the plan construction in the planner 30 is biased to have an outcome probability closest to the target T, and this bias can create paths capable of isolating faults in specific actions. Prior to detection of a system fault, the plant 20 may produce products 52 at a nominal rate $r_{nom}$, with diagnosis efforts beginning once some abnormal outcome is observed. The length of time required to diagnose a given fault in the system (e.g., to identify faulty plant components or resources 21-24) will be short if dedicated, explicit diagnostic plans 54 are selected, with pervasive diagnosis approaches taking somewhat longer, and passive diagnostic techniques taking much longer and possibly not being able to completely diagnose the problem(s). With regard to diagnosis cost, however, explicit dedicated diagnosis results in high production loss (production is halted), while purely passive diagnosis incurs the highest expected repair costs due to its lower quality diagnosis. The pervasive diagnosis aspects of the present disclosure advantageously integrate diagnostic objectives 34b into production planning by operation of the planner 30, and therefore facilitate realization of a lower minimal total expected production loss in comparison to passive and explicit diagnosis.

The passive diagnostic aspects of the disclosure, moreover, are generally applicable to a wide class of production manufacturing problems in which it is important to optimize efficiency but the cost of failure for any one job is low compared to stopping the production system to perform explicit diagnosis. In addition, the disclosure finds utility in association with non-manufacturing production systems, for example, service industry organizations can employ the pervasive diagnostic techniques in systems that produce services using machines, software, and/or human resources. Moreover, the disclosure is not limited to SAT solver 38 and Boolean formulations 37, wherein other formulation and solution techniques can be employed in which the clauses represent failed plans and each satisfying assignment is interpreted as a valid diagnosis.

Referring now to FIGS. 3 and 8-12, the planner 30 employs a solver 38 (FIG. 3), such as a Boolean satisfiability problem (SAT) solver, in constructing the plans 54 for execution in the plant 20 using the guidance of the diagnosis component 40. In this implementation, the pervasive diagnosis tasks are translated into logical encodings (e.g., CNF, DNNF, BDD, PI, HTMS) to include all possible bounded length plans, and the encoding can be solved in the planner 30 using a SAT solver 38 to answer diagnosis queries such as finding a plan that uses a certain set of modules 22 in the plant 20. This technique allows the planner 30 to submit queries to the SAT solver 38 to yield a solution 39 which can be translated into plans 54.

Figure 8:
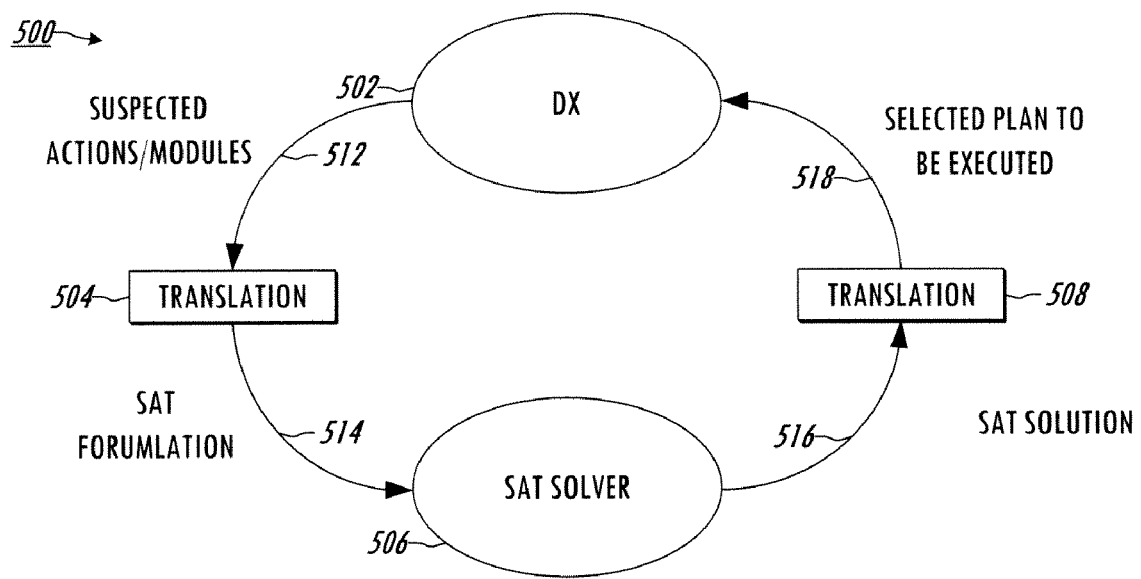
FIG. 8 is a schematic flow diagram illustrating construction of plans in the system of FIGS. 1-3 using a SAT solver in accordance with the disclosure.
Figure 9:
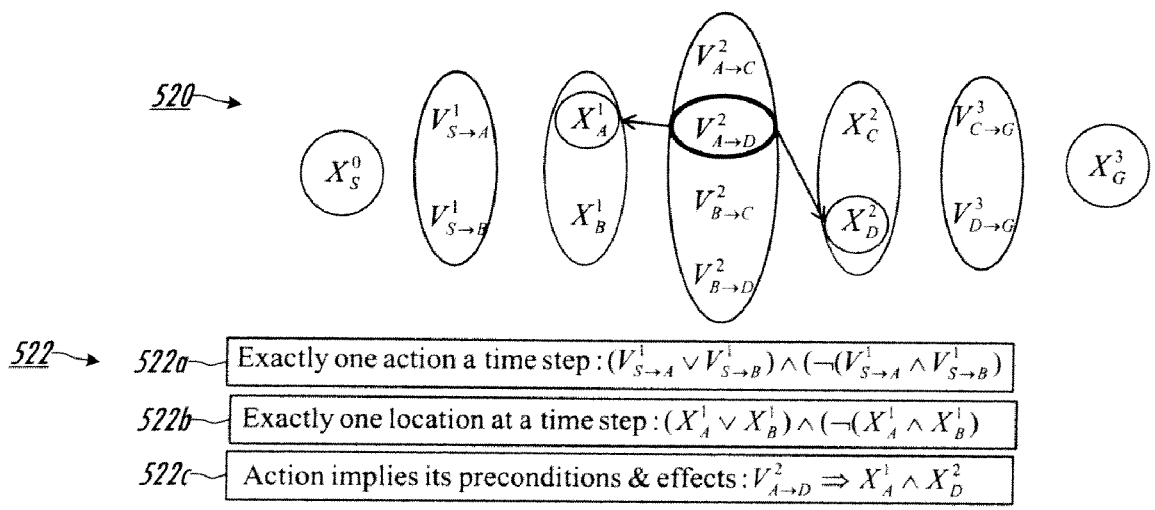
FIGS. 9 and 10 are schematic diagrams illustrating an exemplary SAT formulation and solution of the formulation for the state/action diagram of FIG. 7 including variables and constraints in accordance with the present disclosure.

FIG. 8 schematically illustrates this approach in a diagram 500, where the process begins with a CNF formulation 37 that represents all possible plans with fixed bound on the number of actions or the number of time steps in the plan (i.e., a sequence of bounded length executable actions by a given system that lead from the initial to the goal state). FIG. 9 illustrates one such formulation 37 including Boolean variables 520 and constraints 522, where the variables 520 (V in FIG. 9) represent actions and/or resources 21-24 in the plant 20 with Boolean values that transition the state of the plant 20 from one location (X in the figure) to another. The constraints 522 in this formulation require that only one action is performed in each time step (constraint 522a), that a product 52 is in only one plant location at a time (constraint 522b), and that each action implies its preconditions and effects (condition 522c). Additional variables corresponding to resources 21-24 may be included in the formulation 37. Additional formulas may also be included to ensure that a module variable is TRUE only if some action that uses that resource is executed.

In one embodiment, at 502 in FIG. 8, the plan construction component 32 formulates the plan generation problem based on the production and diagnostic objectives 34a and 34b, and uses the current plant condition 58 from the diagnosis component 40 to derive a list of suspected actions and/or plant resources 21-24 at 512. These are provided to a translation component 504 in the planner 30 that generates a SAT formulation 514 (e.g., formulation 37 in FIGS. 3 and 12). The SAT problem formulation 514 is then provided to the SAT solver 38, such as by a query to the solver component 38 in FIG. 3, and the solver 38 generates a SAT solution 516 (e.g., solution 39 in FIG. 12). The solution 516 is then translated at 808 to yield a generated plan 54 at 518 for execution in the plant 20. The plan 54 and the corresponding observations 56 are provided to the diagnosis component 40 which updates the current condition 58 and the belief model 42 to reduce the set of suspected modules 21-24, and the diagnosis component 40 or the planner 30 add appropriate formulas to the SAT encoding to reflect those changes.

Figure 10:
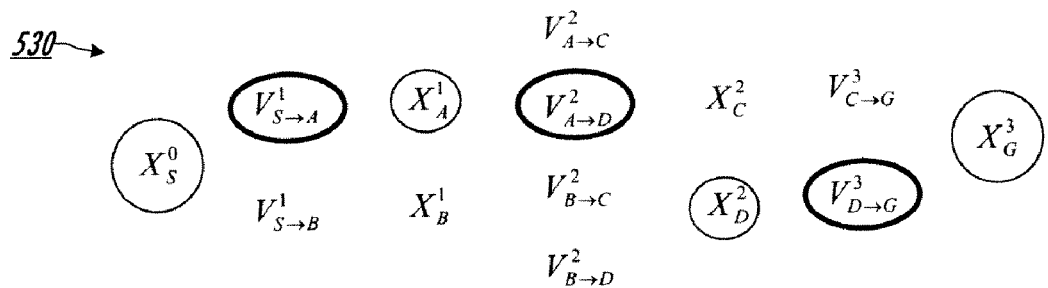

FIG. 10 shows a schematic diagram 530 illustrating the resulting graph of a solution 39 from the SAT solver 38 for this example, in which the path through nodes S, A, D, G is translated by extracting the actions that have their SAT variable equal to TRUE in the solution 39 to yield the plan 54. Moreover, the solver 38 is aware of how many suspected actions/resources are in the solution 39. This embodiment is flexible, as the formulation or encoding 37 can be easily tightened or loosened to answer different queries by adding/removing additional clauses (constraints) and/or variables. For example, this approach can enforce the plans to use a pre-determined subset of (suspected) actions/modules. Variations are possible, for example, using Max-SAT solvers 38 and formulations 37 to find a solution 39 that maximizes the number of clauses, or Weighted Max-SAT which assigns weights to clauses and finds a solution that maximizes the total satisfied weights. The SAT approach also allows Model-counting to quickly count the number of solutions, and the SAT solver 38 can return multiple solutions for subsequent evaluation of an objective function 37c or some other final selection criteria. Moreover, quantified Boolean formula (QBF) can be employed to extend SAT with quantifications.

Figure 11:
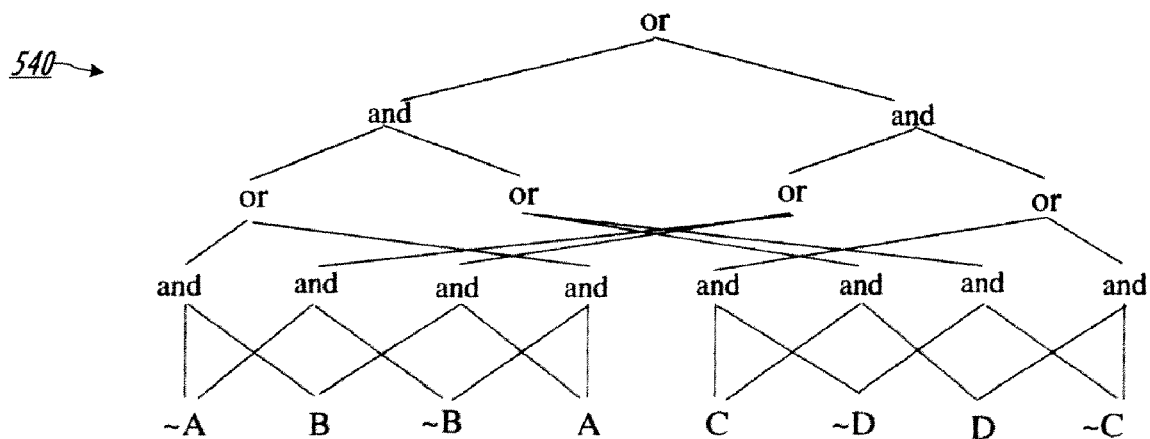
FIG. 11 is a schematic diagram illustrating an exemplary d-DNNF representation of the formulation of FIGS. 9 and 10.

Referring also to FIG. 11, the SAT formulation 37 can be expressed as a decomposable disjunctive negation form (d-DNNF) representation of SAT. FIG. 11 is a schematic diagram illustrating an exemplary d-DNNF representation 540 of the formulation of FIGS. 9 and 10 using Boolean operators. Moreover, there are many ways to represent the same set of variables and constraints in SAT, such as CNF, DNF, NNF. d-DNNF allows many SAT queries to be answered easier, such as to find the solution 39 that goes through as close to half the suspected actions/modules. In this formulation, the solver 38 tries to find the solution 39 that has the same number of positive and negative assignments for suspected actions/resources. The system could also employ a variation of model-counting in d-DNNF, in which each (partial) SAT solution is labeled with the number of suspected actions/resources currently assigned TRUE, and for each possible value, keep one full solution 39. Then, all stored plans are compared and the one closest to 50% is selected for translation into a plan 54, where this variant can employ branch-and-bound for possible improvement. Other possible alternatives can be used, including without limitation constraint satisfaction problem (CSP) and constraint satisfaction optimization problem (CSOP), mixed integer linear programming (MILP) such as linear programming (LP) formulation or integer linear programming (ILP) formulations. In each of these techniques, the planner 30 can be operative to receive a suspected set of component resources/actions from the diagnosis component 40, search for a solution that satisfies a production goal 34a, formulate the problem as a suitable substrate (e.g. CSP, CSOP, LP, ILP), solve the resulting formulation while trying to use ½ of the resources/actions in suspected set (this maps to a problem of minCost sat), and compile to d-DNNF for efficiency.

For a MILP formulation, the variables 37b can be any real value (LP) or integer value (ILP), and the constraints 37a can be linear constraints, such as v1.X1+v2.X2+ . . . + vn.Xn≦/=V (vi are constants). The objective function 37c in one example could be to minimize Σ ni.Xi, where ni are constants. The solution in this case could be any value assignments to all variables Xi that optimize for the objective function. LP/ILP can handle "continuous" variables, and is thus potentially more expressive than SAT. Whereas MILP implementations may not be as naturally suitable for simple classes of planning/diagnosis problems, these can potentially be useful for more complex problems. MILP solvers 38, moreover, have an objective function and can thus search for the optimal solution 37, instead of just any solution 37.

CSP implementations are possible in which the variables 37b can be any set of discrete values (e.g. Color={Red, Green, Blue}), and may be implemented as a generalized version of SAT for two values. This can include continuous/integer values, and may thus subsume LP/ILP. The CSP constraints 37a can be any constraint between different assignments of different variables (e.g. Color1=Red→Color2≠Green), and the solution 39 can be any value assignments to all variables that satisfy all constraints 37a (e.g., like SAT). CSOP implementations can also optimize for a given objective function like LP/ILP. Using the above example of FIG. 7, exemplary CSP variables can be defined as locations with variable values indicating actions that lead to the locations. CSP implementations may be the most versatile framework, in which variables with discrete values are most common, and CSP in general can handle any type of variable with any type of values.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A control system for controlling operation of a production system with a plant that can achieve one or more production goals by execution of plans using one or more plant resources, the control system comprising:
  at least one processor;
  a plant model including a model of the plant;
  a diagnosis component implemented using the at least one processor and operatively coupled with the plant to determine a current plant condition based at least partially on a previously executed plan, at least one corresponding observation from the plant, and the plant model; and
  a planner operative to receive at least one diagnostic goal from the diagnosis component and at least one production goal, the planner comprising:
    a formulation representing possible actions in the plant including;

constraints and variables for each action to transition the plant from a starting state to a goal state defined by at least one production goal, and an objective function evaluating the number of plant resources suspected of being fault that are used in a given solution, a solver implemented using the at least one processor and operative to provide at least one solution to the formulation based at least partially on the at least one production goal, at least one diagnostic goal, and the current plant condition, and a translation component operative to translate the solution into a plan and to provide the plan to the plant for execution;

wherein the planner is operative to select at least one solution for which the number of suspected resources used in the solution is closest to half of the suspected plant resources.

2. The control system of claim 1, wherein the solver is a SAT solver.

3. The control system of claim 2:
wherein the constraints and variables for each plant state are Boolean;
wherein the current plant condition includes an indication of which plant resources are suspected of being faulty;
wherein the formulation further includes an objective function evaluating the number of plant resources suspected of being faulty that are used in a given solution.

4. The control system of claim 2, wherein the formulation is one of a conjunctive normal form (CNF) formulation, a decomposable disjunctive negation form (DNNF) formulation, a binary decision diagram (BDD) formulation, a programmed instruction (PI) formulation, a negation normal form (NNF) formulation, and a hybrid truth maintenance system (HTMS) formulation.

5. The control system of claim 2, wherein the formulation is one of a conjunctive normal form (CNF) formulation and a decomposable disjunctive negation form (DNNF) formulation.

6. The control system of claim 1, wherein the formulation is a constraint satisfaction problem (CSP) formulation.

7. The control system of claim 6, wherein the formulation is a constraint satisfaction optimization problem (CSOP) formulation.

8. The control system of claim 1, wherein the formulation is a linear programming (LP) formulation.

9. The control system of claim 1, wherein the formulation is an integer linear programming (ILP) formulation.

10. The control system of claim 1, wherein the formulation further includes an objective function evaluating fault probabilities of plant resources, and wherein the planner is operative to select at least one solution based at least partially on the fault probabilities.

11. A method of generating plans for execution in a production system with a plant to achieve one or more production goals, the method comprising:
determining a current plant condition based at least partially on a previously executed plan, at least one corresponding observation from the plant, and a plant model;
providing a formulation representing possible actions in the plant including constraints and variables for each action to transition the plant from a starting state to a goal state defined by at least one production goal;
solving the formulation to provide at least one solution to the formulation based at least partially on the at least one production goal, the at least one diagnostic goal, and the current plant condition, wherein solving the formulation comprises evaluating an objective function based on the number of plant resources suspected of being faulty that are used in a given solution, and selecting at least one solution for which number of suspected resources used in the solution is closest to half of the suspected plant resources;
translating the solution into a plan; and
providing the plan to the plant for execution.

12. The method of claim 11, wherein solving the formulation further comprises:
evaluating an objective function with respect to fault probabilities of plant resources; and
selecting at least one solution based at least partially on the fault probabilities.

13. A non-transitory computer readable medium having computer executable instructions for performing the steps of:
determining a current plant condition based at least partially on a previously executed plan, at least one corresponding observation from the plant, and a plant model;
providing a formulation representing possible actions in the plant including constraints and variables for each action to transition the plant from a starting state to a goal state defined by at least one production goal;
solving the formulation to provide at least one solution to the formulation based at least partially on the at least one production goal, the at least one diagnostic goal, and the current plant condition, wherein the computer executable instructions for solving the formulation comprise:
computer executable instructions for evaluating an objective function based on the number of plant resources suspected of being faulty that are used in a given solution, and
computer executable instructions for selecting at least one solution for which number of suspected resources used in the solution is closest to half of the suspected plant resources;
translating the solution into a plan; and
providing the plan to the plant for execution.

14. The computer readable medium of claim 13, wherein the computer executable instructions for solving the formulation comprise computer executable instructions for:
evaluating an objective function fault with respect to probabilities of plant resources; and
selecting at least one solution based at least partially on the fault probabilities.

15. A control system for controlling operation of a production system with a plant that can achieve one or more production goals by execution of plans using one or more plant resources, the control system comprising:
at least one processor;
a plant model including a model of the plant;
a diagnosis component implemented using the at least one processor and operatively coupled with the plant to determine a current plant condition based at least partially on a previously executed plan, at least one corresponding observation from the plant, and the plant model, the current plant condition indicating fault status of the one or more plant resources; and
a planner operative to receive at least one diagnostic goal from the diagnosis component and at least one production goal, the planner comprising:
a formulation representing possible actions in the plant including constraints and variables for each action to transition the plant from a starting state to a goal state defined by at least one production goal, a solver implemented using the at least one processor and operative to provide at least one solution to the formulation based at least partially on the at least one production goal, at least one diagnostic goal, and the current plant condition, and a translation component operative to translate the solution into a plan and to provide the plan to the plant for execution.

16. The control system of claim 15, wherein the solver is a SAT solver.

17. The control system of claim 15, wherein the formulation is a constraint satisfaction problem (CSP) formulation.

18. The control system of claim 17, wherein the formulation is a constraint satisfaction optimization problem (CSOP) formulation.

19. The control system of claim 15, wherein the formulation is a constraint satisfaction optimization problem (CSOP) formulation.

20. The control system of claim 15, wherein the formulation further includes an objective function evaluating fault probabilities of plant resources, and wherein the planner is operative to select at least one solution based at least partially on the fault probabilities.

* * * * *